US012158030B2

(12) United States Patent
Nakamura et al.

(10) Patent No.: US 12,158,030 B2
(45) Date of Patent: Dec. 3, 2024

(54) LATCH MECHANISM OF OPENING/CLOSING DOOR AND DEVICE INCLUDING OPENING/CLOSING DOOR USING LATCH MECHANISM

(71) Applicant: FUJIFILM Business Innovation Corp., Tokyo (JP)

(72) Inventors: Wataru Nakamura, Kanagawa (JP); Shuichi Nishide, Kanagawa (JP); Akira Ueshima, Kanagawa (JP); Michiaki Yoshida, Kanagawa (JP); Keigo Shinoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 78 days.

(21) Appl. No.: 17/727,802

(22) Filed: Apr. 24, 2022

(65) Prior Publication Data

US 2023/0203860 A1 Jun. 29, 2023

(30) Foreign Application Priority Data

Dec. 27, 2021 (JP) ................................ 2021-213120

(51) Int. Cl.
*E05C 1/08* (2006.01)
*E05C 1/10* (2006.01)

(52) U.S. Cl.
CPC ................ *E05C 1/085* (2013.01); *E05C 1/10* (2013.01)

(58) Field of Classification Search
CPC . E05C 1/085; E05C 1/10; E05C 19/02; E05C 19/028; E05C 19/04; E05C 19/06;
(Continued)

(56) References Cited

U.S. PATENT DOCUMENTS 618,895 A * 2/1899 Munday .................. E05C 19/06 24/615
9,151,095 B2 * 10/2015 Syring ................ E05B 17/0025

FOREIGN PATENT DOCUMENTS

JP 2000231322 8/2000

* cited by examiner

*Primary Examiner* — Christine M Mills
*Assistant Examiner* — Yahya Sidky
(74) *Attorney, Agent, or Firm* — JCIPRNET

(57) ABSTRACT

A latch mechanism of an opening/closing door, which is used in a device including an opening/closing door that opens/closes an opening of a device body by using the opening/closing door, restrains the opening/closing door at a closing position, and releases a restrained state when the opening/closing door is opened, the latch mechanism includes an elastic component provided in one of the opening/closing door and the device body facing the opening, having a spring member expanding/contracting to be elastically deformable in one predetermined direction, and holding both end positions of the spring member to be floatable via a holder, and a latch component provided in the other of the opening/closing door and the device body, coming into contact with the holder of the elastic component when the opening/closing door closes the opening, having a latch member restraining the elastic component in a state where the spring member is elastically deformed from an initial state, and moving the holder against a biasing force of the spring member to release the restrained state between the elastic component and the latch member when the opening/closing door is opened from the closing position.

11 Claims, 11 Drawing Sheets

(58) Field of Classification Search
CPC ............. E05C 19/063; Y10T 292/0894; Y10T 292/68; Y10T 292/688; Y10T 292/696; Y10T 292/705; Y10T 292/707; Y10S 292/55; Y10S 292/51; Y10S 292/11; E05B 15/0006; E05B 15/022; E05B 15/024
See application file for complete search history.

WHEN LATCH STARTS

WHEN LATCH IS COMPLETED

WHEN LATCH STARTS

EXCEEDING UPPER INFLECTION POINT

EXCEEDING LOWER INFLECTION POINT

WHEN LATCH IS COMPLETED

WHEN LATCH STARTS

EXCEEDING UPPER INFLECTION POINT

EXCEEDING LOWER INFLECTION POINT

WHEN LATCH IS COMPLETED

WHEN LATCH STARTS

EXCEEDING UPPER INFLECTION POINT

EXCEEDING LOWER INFLECTION POINT

WHEN LATCH IS COMPLETED

WHEN LATCH STARTS

EXCEEDING UPPER INFLECTION POINT

EXCEEDING LOWER INFLECTION POINT

WHEN LATCH IS COMPLETED

LATCH MECHANISM OF OPENING/CLOSING DOOR AND DEVICE INCLUDING OPENING/CLOSING DOOR USING LATCH MECHANISM

CROSS-REFERENCE TO RELATED APPLICATIONS

This application is based on and claims priority under 35 USC 119 from Japanese Patent Application No. 2021-213120 filed Dec. 27, 2021.

BACKGROUND

(i) Technical Field

The present disclosure relates to a latch mechanism of an opening/closing door and a device including an opening/closing door using the latch mechanism.

(ii) Related Art

As a device including an opening/closing door, for example, an image forming device disclosed in JP2000-231322A is known.

In JP2000-231322A, a subunit attachment structure of the image forming device is disclosed as follows. The subunit attachment structure includes a latch mechanism. In the latch mechanism, between a subunit and a unit receiving portion, latch members (configured to include elastic members) respectively provided in the subunit and the unit receiving portion freely engage with and disengage from each other so that the subunit and the unit receiving portion maintain a mounted state. A peak point position of an engagement reaction force of the latch mechanism when the subunit is mounted and operated is displaced forward of an engagement completion position (corresponding to a mounting completion position of the subunit) of the latch mechanism. In this manner, the subunit attachment structure reduces an operation force of pushing the subunit into the unit receiving portion.

SUMMARY

Aspects of certain non-limiting embodiments of the present disclosure relate to a latch mechanism of an opening/closing door and a device including an opening/closing door using the latch mechanism that functions as the latch mechanism of the opening/closing door to reduce a tolerance in an elastic deformation direction which affects a latch force or an operation force, compared to a case of using elastically deformable latch members for both the opening/closing door and a device body.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a latch mechanism of an opening/closing door, which is used in a device including an opening/closing door that opens/closes an opening of a device body by using the opening/closing door, restrains the opening/closing door at a closing position, and releases a restrained state when the opening/closing door is opened, the latch mechanism includes an elastic component provided in one of the opening/closing door and the device body facing the opening, having a spring member expanding/contracting to be elastically deformable in one predetermined direction, and holding both end positions of the spring member to be floatable via a holder, and a latch component provided in the other of the opening/closing door and the device body, coming into contact with the holder of the elastic component when the opening/closing door closes the opening, having a latch member restraining the elastic component in a state where the spring member is elastically deformed from an initial state, and moving the holder against a biasing force of the spring member to release the restrained state between the elastic component and the latch member when the opening/closing door is opened from the closing position.

BRIEF DESCRIPTION OF THE DRAWINGS

Exemplary embodiment(s) of the present invention will be described in detail based on the following figures, wherein:

FIG. 8A is a view for describing a state when latch starts, FIG. 8B is a view for describing a state when latch exceeds an upper inflection point, FIG. 8C is a view for describing a state when latch exceeds a lower inflection point, and FIG. 8D is a view for describing a state when latch is completed;

FIG. 9A is a view for describing a state when latch starts, FIG. 9B is a view for describing a state when latch exceeds an upper inflection point, FIG. 9C is a view for describing a state when latch exceeds a lower inflection point, and FIG. 9D is a view for describing a state when latch is completed;

FIG. 10A is a view for describing a state when latch starts, FIG. 10B is a view for describing a state when latch exceeds an upper inflection point, FIG. 10C is a view for describing a state when latch exceeds a lower inflection point, and FIG. 10D is a view for describing a state when latch is completed; FIG. 11A is a view for describing a state when latch starts, FIG. 11B is a view for describing a state when latch exceeds an upper inflection point, FIG. 11C is a view for describing a state when latch exceeds a lower inflection point, and FIG. 11D is a view for describing a state when latch is completed.

DETAILED DESCRIPTION

Outline of Exemplary Embodiments

Figure 1A:
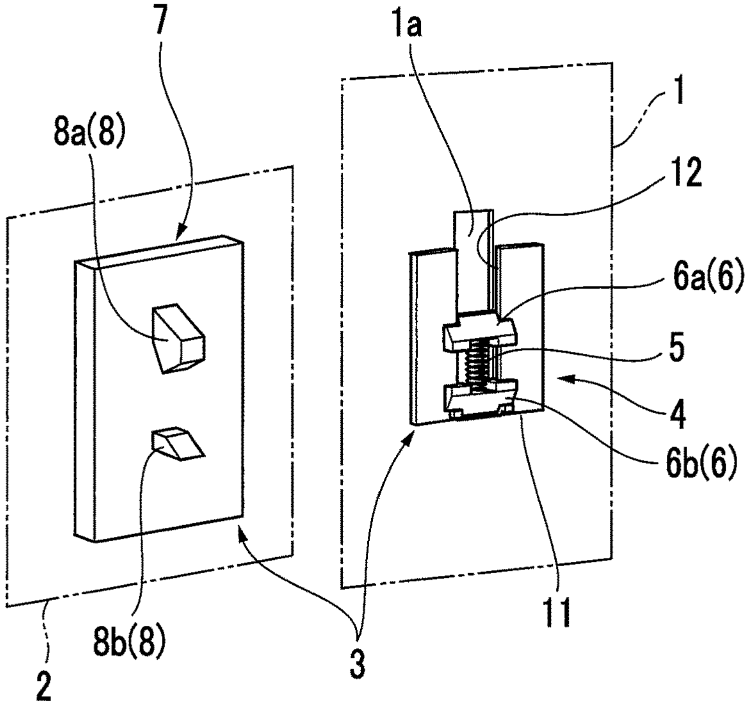
FIG. 1A is a view for describing an outline of an exemplary embodiment of a latch mechanism of an opening/closing door and a device including an opening/closing door using the latch mechanism, to which the present disclosure is applied.

FIG. 1A is a view for describing an outline of an exemplary embodiment of a latch mechanism of an opening/closing door and a device including an opening/closing door using the latch mechanism, to which the present disclosure is applied.

In the drawing, the device including the opening/closing door includes a device body 1 having an opening (not shown), an opening/closing door 2 that opens/closes the opening, and a latch mechanism 3 that restrains the opening/closing door 2 at a closing position, and releases a restrained state of the opening/closing door 2 when the opening/closing door 2 is opened.

In this example, the latch mechanism 3 includes an elastic component 4 provided in one (in this example, the device body 1) of the opening/closing door 2 and the device body 1 facing the opening, having a spring member 5 expanding/contracting to be elastically deformable in one predetermined direction, and holding both end positions of the spring member 5 to be floatable via a holder 6 (specifically, 6*a* and 6*b*), and a latch component 7 provided in the other (in this example, the opening/closing door 2) of the opening/closing door 2 and the device body 1, coming into contact with the holder (6*a* and 6*b*) of the elastic component 4 when the opening/closing door 2 closes the opening, having a latch member 8 restraining the elastic component 4 in a state where the spring member 5 is elastically deformed from an initial state, and moving the holder (6*a* and 6*b*) against a biasing force of the spring member 5 to release the restrained state between the elastic component 4 and the latch member 8 when the opening/closing door 2 is opened from the closing position.

In an aspect shown in FIG. 1A, an aspect is shown in which the elastic component 4 is installed on the device body 1 side and the latch component 7 is installed on the opening/closing door 2 side. However, installation positions of the elastic component 4 and the latch component 7 may be reversed.

In this technical method, in the latch mechanism 3, the elastic component 4 may be installed in one of mutually facing portions of the device body 1 and the opening/closing door 2, and the latch component 7 may be installed in the other. The latch mechanism 3 may be installed in at least one location, but the latch mechanisms 3 may be installed in a plurality of locations.

For example, in the aspect shown in FIG. 1A, the elastic component 4 is installed on the device body 1 side. However, in the aspect, the elastic component 4 is installed on a back side of the device body 1 facing the opening/closing door 2. Therefore, an insertion port 1*a* such as a slit into which the latch member 8 of the latch component 7 provided on the opening/closing door 2 side can be inserted is provided in a location corresponding to the elastic component 4 of the device body 1. However, in an aspect in which the elastic component 4 is installed on a front side (corresponding to the opening/closing door 2 side) of the device body 1, and in an aspect in which the elastic component 4 is installed to be close to the front side of the device body 1, in a case where the latch member 8 and the device body 1 interfere with each other, the above-described insertion port 1*a* needs to be provided in the device body 1. However, for example, in a case where the elastic component 4 is installed to project from the front side of the device body 1, a restraint operation of the elastic component 4 can be performed by the latch member 8 without providing the above-described insertion port 1*a*.

In this example, the elastic component 4 may hold both ends of the spring member 5 that expands/contracts along a predetermined direction (vertical direction in FIG. 1A) by using the holder 6 (6*a*, 6*b*).

Here, as the spring member 5, a coil spring or a leaf spring may be appropriately selected as long as the coil spring or the leaf spring is elastically deformed in a predetermined expanding/contracting direction. In addition, as an attachment structure of the holder 6, any structure may be appropriately selected as long as the structure holds the spring member 5 to be floatable. For example, a guide groove 12 extending in the expanding/contracting direction of the spring member 5 may be formed in an attachment member 11 separately attached to the device body 1, and a sliding target portion slidable along the guide groove 12 may be formed in the holder 6 so that the holder 6 is attached to be slidable along the guide groove 12 via the sliding target portion. In this example, the holder 6 is attached to the attachment member 11. However, as a matter of course, the attachment portion of the holder 6 may be integrally provided and attached to a portion of the device body 1.

On the other hand, the latch member 8 needs a function of elastically deforming and restraining the spring member 5 of the elastic component 4. Therefore, any material may be appropriately used as long as the material has at least rigidity to withstand elastic deforming required by the spring member 5.

In addition, in the aspect shown in FIG. 1A, the latch component 7 may be provided on the device body 1 side of the opening/closing door 2, and may be attached separately from the opening/closing door 2. Alternatively, the whole latch component 7 may be integrally formed in a portion of the opening/closing door 2. Alternatively, a portion of the latch component 7 may be integrally formed in a portion of the opening/closing door 2, and a remaining portion may be separately formed.

Furthermore, in the aspect shown in FIG. 1A, the latch component 7 may have at least the latch member 8 having a shape that protrudes toward the device body 1 side from an inside of the opening/closing door 2 and can restrain the elastic component 4.

Figure 1B:
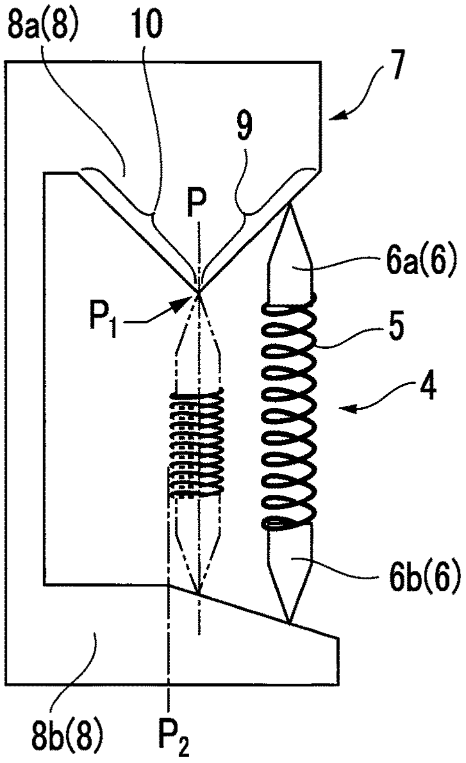
FIG. 1B is a view for describing and schematically showing a behavior when latch of the latch mechanism of the opening/closing door starts.
Figure 1C:
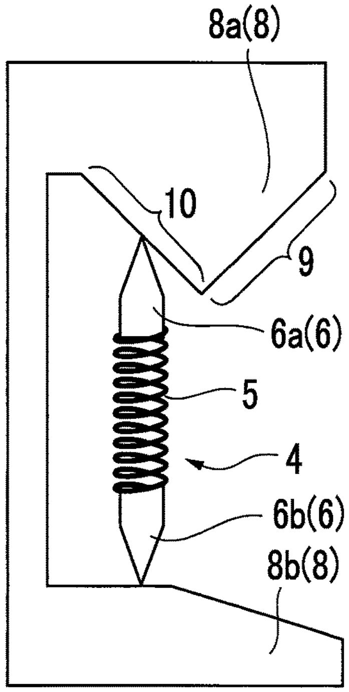
FIG. 1C is a view for describing and schematically showing a behavior when latch of the latch mechanism of the opening/closing door is completed.

Here, with regard to the number and a shape of the latch members 8, the latch member 8 may be provided to restrain the elastic component 4 by using elastic deforming of the spring member 5 of the elastic component 4. As an aspect of restraining the elastic component 4, as shown in FIGS. 1B and 1C, an aspect may be adopted in which the holder 6 of the elastic component 4 is pinched from the outside by a pair of latch members 8 (specifically, 8*a* and 8*b*). Alternatively, an aspect may be adopted in which the holder 6 of the elastic component 4 is spread from the inside by one latch member (not shown).

Although the latch mechanism disclosed in JP2000-231322A is applicable to the opening/closing door instead of a subunit, the latch mechanism has a configuration in which a pair of latch members formed of elastic members are elastically deformed to engage with and disengage from each other. An attachment tolerances of the respective latch members are accumulated. In a case where the accumulated tolerances increase, an operation force or a latch force of the latch mechanism is inevitably greatly affected, thereby causing a possibility that operability of the opening/closing door may be impaired.

Next, in the present exemplary embodiment, a representative aspect or an aspect of the latch mechanism 3 will be described.

First, the aspect of the elastic component 4 includes an aspect of using the spring member 5 that expands/contracts in the vertical direction. In a case where the spring member 5 is installed in this way, and in a case where a restrained state by the latch mechanism 3 is released, the spring member 5 moves to a lower side in the vertical direction by an own weight. Therefore, for example, the configuration is preferable in that the elastic component 4 is likely to return to an initial position by using the own weight.

In addition, the aspect of the elastic component 4 includes an aspect in which the guide groove 12 is formed along the expanding/contracting direction of the spring member 5 with respect to the device body 1 which is an installation target, and the holder 6 is held to be slidable in the guide groove 12. According to this example, the holder 6 acts as a slider. Therefore, for example, the configuration is preferable in that an expanding/contracting operation of the spring member 5 is smoothly performed.

In addition, as described above, a representative aspect of the latch component 7 includes an aspect having the latch member 8 pinching and restraining the elastic component 4.

In the aspect of this example, as shown in FIGS. 1B and 1C, the latch member 8 has an aspect having a first guide portion 9 guiding the holder 6 so that a compression amount of the spring member 5 is a peak value by gradually performing compressive deforming on the spring member 5 from the initial state when the opening/closing door 2 closes the opening, and a second guide portion 10 guiding the holder 6 to reach a latch position where the compression amount has a predetermined value smaller than the peak value by gradually relaxing the compressive deforming performed on the spring member 5 from a peak state after the compression amount of the spring member 5 exceeds the peak value. In this example, the compressive deforming is performed on the spring member 5 to have the peak value, and thereafter, a compressed state of the spring member 5 is relaxed. In this manner, the elastic component 4 can be pinched and restrained by the latch member 8.

In FIGS. 1B and 1C, the elastic component 4 is represented by simplifying shapes of the spring member 5 and the holder 6. In addition, the latch component 7 is represented by simplifying a shape of the latch member 8.

The aspect of this type of the first guide portion 9 and the second guide portion 10 includes the following aspect. As shown in FIGS. 1B and 1C, the latch member 8 (specifically, 8*a* and 8*b*) has a pair of latch arms for pinching the elastic component 4. One latch arm has one side guide surface formed in a V-shape while a boundary line between the first guide portion 9 and the second guide portion 10 serves as an inflection point, and the other latch arm has the other side guide surface formed in a V-shape at a wider angle than the one side guide surface while a position beyond the boundary line between the first guide portion 9 and the second guide portion 10 serves as the inflection point.

In this example, for example, the compression amount of the spring member 5 is the peak value when passing through a boundary line P (corresponding to a position of an inflection point P1 of one latch arm) between the first guide portion 9 and the second guide portion 10, and thereafter, the compressed state of the spring member 5 is relaxed. However, when passing through a position of an inflection point P2 of the other latch arm, a widening change rate of a span along the expanding/contracting direction of the spring member 5 from the second guide portion 10 increases compared to a widening change rate before the inflection point P2. Therefore, for example, the configuration is preferable in that the elastic component 4 is likely to be pulled into the second guide portion 10 of the latch component 7, and the latch component 7 smoothly pinches and restrains the elastic component 4.

In this example, both the first guide portion 9 and the second guide portion 10 are provided in the latch member 8. However, an aspect may be adopted as follows. Both may be provided in the holder 6 instead of the latch member 8 to guide the latch member 8.

In addition, as described above, another representative aspect of the latch component 7 includes an aspect having the latch member 8 (aspect different from the aspect shown in FIGS. 1B and 1C) that spreads and restrains the elastic component 4.

In the aspect of this example, the aspect may be adopted as follows. The latch member 8 has the first guide portion 9 guiding the holder 6 (6*a* and 6*b*) so that a tension amount of the spring member 5 is the peak value by gradually performing tensile deforming on the spring member 5 from the initial state when the opening/closing door 2 closes the opening, and the second guide portion 10 guiding the holder 6 (6*a* and 6*b*) so that the tension amount has a predetermined value smaller than the peak value by gradually relaxing the tensile deforming performed on the spring member 5 from the peak state after a deforming amount of the spring member 5 exceeds the peak value. In this example, the tensile deforming is performed on the spring member 5 to have the peak value, and thereafter, a tension state of the spring member 5 is relaxed. In this manner, the elastic component 4 can be spread and restrained by the latch member 8.

The aspect of this type of the first guide portion 9 and the second guide portion 10 includes the following aspect. Unlike FIGS. 1B and 1C, the latch member 8 has a latch block (not shown) that spreads the elastic component 4. A side facing one holder 6 (for example, 6*a*) of the latch block has one side guide surface formed in a V-shape while a boundary line between the first guide portion 9 and the second guide portion 10 serves as an inflection point, and a side of the latch block facing the other holder 6 (for example, 6*b*) has the other side guide surface formed in a V-shape at a wider angle than the one side guide surface while a position beyond the boundary line between the first guide portion 9 and the second guide portion 10 serves as the inflection point.

In this example, for example, the tension amount of the spring member 5 is the peak value when passing through the boundary line (corresponding to a position of the inflection point on the side of the latch block facing one holder (for example, 6*a*)) between the first guide portion 9 and the second guide portion 10, and thereafter, the tension state of the spring member 5 is relaxed. However, when passing through a position of the inflection point on the side facing the other holder (for example, 6*b*) of the latch block, a narrowing change rate of a span along the expanding/contracting direction of the spring member 5 from the second guide portion 10 increases compared to a widening change rate in front of the inflection point. Therefore, for example, the configuration is preferable in that the elastic component 4 is likely to be pulled into the second guide portion 10 of the latch component 7, and the latch component 7 smoothly spreads and restrains the elastic component 4.

In this example, both the first guide portion 9 and the second guide portion 10 are provided in the latch member 8. However, an aspect may be adopted as follows. Both may be provided in the holder 6 instead of the latch member 8 to guide the latch member 8.

Hereinafter, the present disclosure will be described in detail, based on exemplary embodiments shown in the accompanying drawings.

Exemplary Embodiment 1

Figure 2:
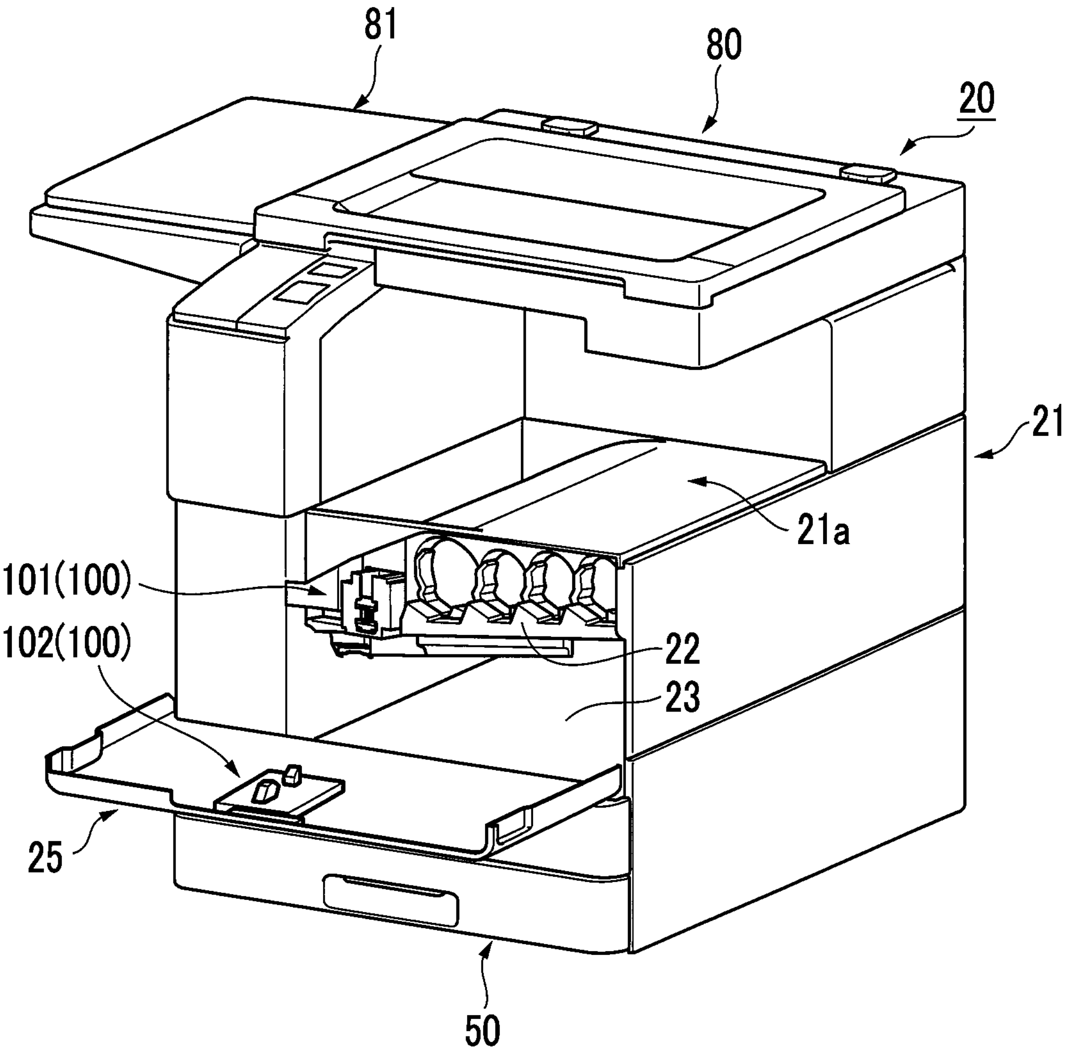
FIG. 2 is an external perspective view showing an overall configuration of an image forming device serving as a device including an opening/closing door according to Exemplary Embodiment 1.

FIG. 2 is an external perspective view showing an overall configuration of an image forming device serving as a device including an opening/closing door according to Exemplary Embodiment 1.

Overall Configuration of Image Forming Device

In the drawings, in an image forming device 20, an image forming engine 30 (refer to FIG. 3) mounted inside a device housing 21, a medium supply device 50 that accommodates a medium such as paper is installed in a lower portion of the device housing 21, and an image reading device 80 is installed in an upper portion of the device housing 21. A reference numeral 81 indicates a document feeding device for feeding a document to the image reading device 80.

In this example, the device housing 21 has a hollow portion 21*a* in which the medium having an image formed by the image forming engine 30 is discharged and accommodated in a lower portion of the image reading device 80, and an accommodation space of the image forming engine 30 is secured below the device housing 21.

In this example, the device housing 21 includes a device body 22 having an opening 23 for inserting or removing the image forming engine 30 into or from a user's operation side (in this example, a "front side"), and an opening/closing door 25 that opens/closes the opening 23 of the device body 22.

Here, the device body 22 includes a main body frame that frames a shape of the device housing 21, an interior material mounted on the main body frame and installed inside the device housing 21, and an exterior material mounted on the main body frame and installed outside the device housing 21.

In addition, the opening/closing door 25 is provided in a lower edge portion of the opening 23 of the device body 22 to be swingable via a hinge (not shown), and swings to be openable/closable between an opening position protruding in a substantially horizontal posture with respect to the opening 23 of the device body 22 and a closing position for closing the opening 23.

In this example, a latch mechanism 100 is provided between the opening/closing door 25 and the device body 22 to restrain the opening/closing door 25 at the closing position and to release the restrained state of the opening/closing door 25 when the opening/closing door 25 is opened.

Image Forming Configuration Example of Image Forming Device

Image Forming Engine

Figure 3:
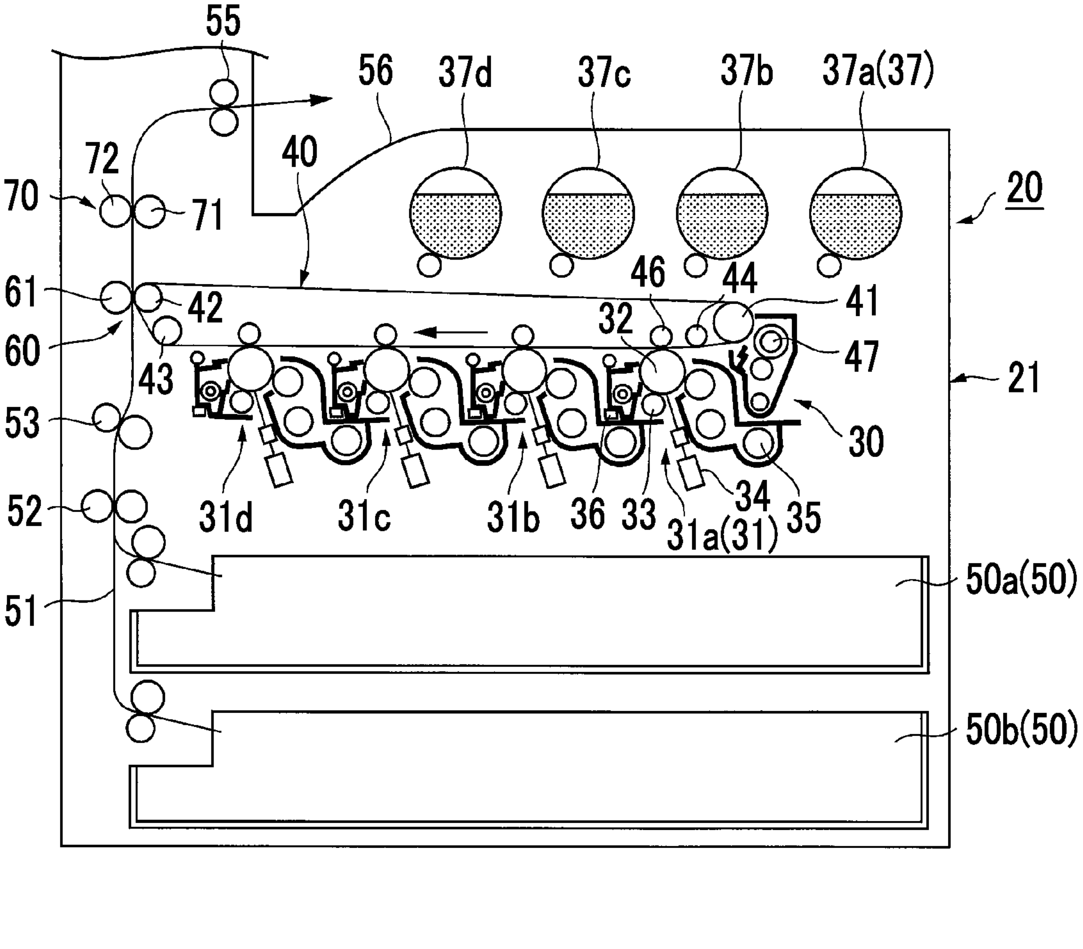
FIG. 3 is a view for describing an image forming configuration example of the image forming device according to Exemplary Embodiment 1.

In the present exemplary embodiment, as shown in FIG. 3, for example, the image forming engine 30 adopts one which includes a plurality of (in this example, four) image forming units 31 (in this example, 31*a* to 31*d*) mounted inside the device housing 21, forming an image on a medium such as paper, and forming a plurality of color component images, for example, a belt-shaped intermediate transfer body 40 that primarily transfers and transports the color component images of the respective image forming unit 31, a transfer device 60 that collectively transfers primary transfer images on the intermediate transfer body 40 to the medium, and a fixing device 70 that fixes the image transferred on the medium. As a matter of course, the present exemplary embodiment is not limited to this example.

Image Forming Unit

In this example, for example, the image forming units 31 are arrayed by adopting postures in a substantially horizontal direction to form color component images of four colors (in this example, yellow (Y), magenta (M), cyan (C), and black (K)). A basic configuration of the respective image forming units 31 (specifically, 31*a* to 31*d*) adopts an electrophotographic method, for example, and includes a drum-shaped photoconductor 32, a charger 33 that charges the photoconductor 32, a latent image writer 34 that writes an electrostatic latent image on the photoconductor 32 charged by the charger 33, a developer 35 that develops the electrostatic latent image formed by the latent image writer 34 with a toner serving as powder (in this example, a two-component developer containing the toner and a carrier is used), and a cleaner 36 that cleans a residue (residual toner) on the photoconductor 32 after the toner image formed on the photoconductor 32 is primarily transferred to the intermediate transfer body 40.

In this example, as the charger 33, a charging roll for contact charging of the photoconductor 32, a corotron for non-contact charging of the photoconductor 32, or a scorotron is used.

In addition, in this example, as the latent image writer 34, for example, one in which the electrostatic latent image is separately written by an LED array for each of the photoconductor 32 is used. However, without being limited thereto, a common laser scanner for writing the electrostatic latent image of each color component with a corresponding laser beam may be provided for each of the photoconductors 32, or a laser scanner may be separately provided for each of the photoconductors 32.

In addition, as the developer 35, for example, one in which the two-component developer containing the toner and the carrier is used. The developing roll is arranged inside a developing container. For example, a plurality of stirring/transporting members are arranged so that a developer is charged while being stirred and mixed inside the developing container. However, without being limited thereto, any developer may be appropriately selected.

Furthermore, as the cleaner 36, a cleaning member such as a cleaning blade, a cleaning brush, and a cleaning roll which scrape off the toner remaining on the photoconductor 32 is appropriately selected and used.

A reference numeral 37 (specifically, 37*a* to 37*d*) indicates a toner cartridge for supplying each color component toner to each of the developers 35 of each of the image forming unit 31 (31*a* to 31*d*).

Intermediate Transfer Body

In addition, the intermediate transfer body 40 is provided on an upper side along an array direction of the plurality of image forming units 31 (31*a* to 31*d*), and is laid across a plurality of (four in this example) tension rolls 41 to 44. In this example, for example, the tension roll 41 is used as a drive roll, the tension roll 42 is used as a facing roll of the transfer device 60 (in this example, the transfer roll 61 is used), and furthermore, the tension roll 43 is used as the tension roll for applying tension to the belt-shaped intermediate transfer body 40.

In addition, a primary transfer device 46 (in this example, a primary transfer roll is used) is provided on a back surface of the intermediate transfer body 40 facing the photoconductor 32 of each of the image forming unit 31 (31*a* to 31*d*), a primary transfer bias is applied to primary transfer device 46, and the image on the photoconductor 32 is transferred to the intermediate transfer body 40 side.

In addition, an intermediate transfer body cleaner 47 is provided in a location where the intermediate transfer body 40 is laid across the tension rolls 41.

Transfer Device and Fixing Device

In the present exemplary embodiment, a basic configuration of the transfer device 60 is as follows. The transfer roll 61 is installed to face the tension roll 42 of the intermediate transfer body 40. For example, the transfer roll 61 is grounded, and a transfer voltage is applied to the tension roll 42 from a transfer power source (not shown). A transfer electric field is formed in a transfer region between the intermediate transfer body 40 and the transfer roll 61. In this manner, the images on the intermediate transfer body 40 are collectively transferred to the paper passing through the transfer region.

Fixing Device

In addition, in the present exemplary embodiment, the fixing device 70 includes a rotatable heat fixing member (in this example, a heating fixing roll is used) 71 in which a surface temperature is heated to a predetermined temperature by a heater serving as a heating source, and a pressure fixing member (in this example, a pressure fixing roll is used) 72 that performs contact rolling with a predetermined contact pressure along an axial direction of the heat fixing member 71. The medium holding an unfixed image passes through a contact area between both the fixing members 71 and 72 so that the unfixed image is fixed.

Medium Transport System

In this example, the medium supply device 50 includes two medium supply units 50*a* and 50*b*. The number or a layout of the medium supply units may be appropriately changed, and a manual feed type medium supply unit may be added as necessary.

In this example, as shown in FIG. 3, a medium transport path 51 extending in a substantially vertical direction is provided on a left side of the drawing inside the device housing 21, and the medium supplied from the medium supply device 50 is transported to a transport roll 52. The medium is aligned by an alignment roll 53 provided in front of the transfer region of the intermediate transfer body 40 and the transfer device 60, and thereafter, is transported to the transfer region. After the medium receives transfer processing of the image on the intermediate transfer body 40, the medium passes through the transfer region of the fixing device 70 to perform fixing processing of the image. The medium subjected to the fixing processing performed by the fixing device 70 is accommodated in a medium discharge receiver 56 formed in the hollow portion 21*a* of the device housing 21 via a discharge roll 55.

In addition, a design of the medium discharge receiver 56 may be appropriately changed depending on a discharge position of the medium. The medium transport system adopts a transport method of forming the image on a single surface of the medium in this example. However, for example, the images may be formed on both surfaces of the medium by adding a double-sided transport module.

Configuration Example of Latch Mechanism

Basic Configuration Example of Latch Mechanism

In this example, as shown in FIG. 2, the latch mechanism 100 includes an elastic component 101 in the device body 22 facing the opening/closing door 25, and a latch component 102 on the opening/closing door 25 side.

In this example, a front upper frame 110 constituting a portion of the device body 22 is provided in a location facing the opening 23 of the opening/closing door 25. A plurality of insertion holes 111 of a toner cartridge 37 (37*a* to 37*d*) shown in FIG. 3 are provided to be open in the front upper frame 110. The elastic component 101 is installed on a lateral portion 112 (refer to FIG. 4A) shifted leftward in the drawing from a position of the insertion hole 111 of the front upper frame 110.

Configuration Example of Elastic Component

Figure 4A:
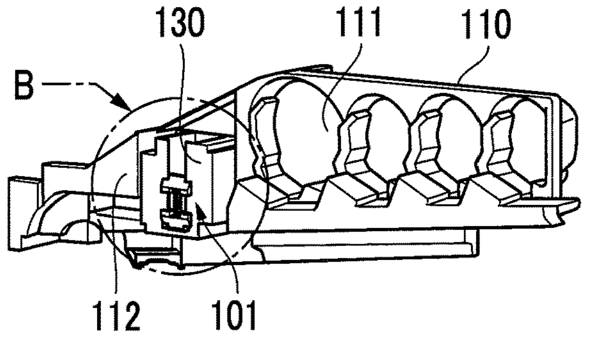
FIG. 4A is a view for describing an attachment location of an elastic component of the latch mechanism according to Exemplary Embodiment 1.
Figure 4B:
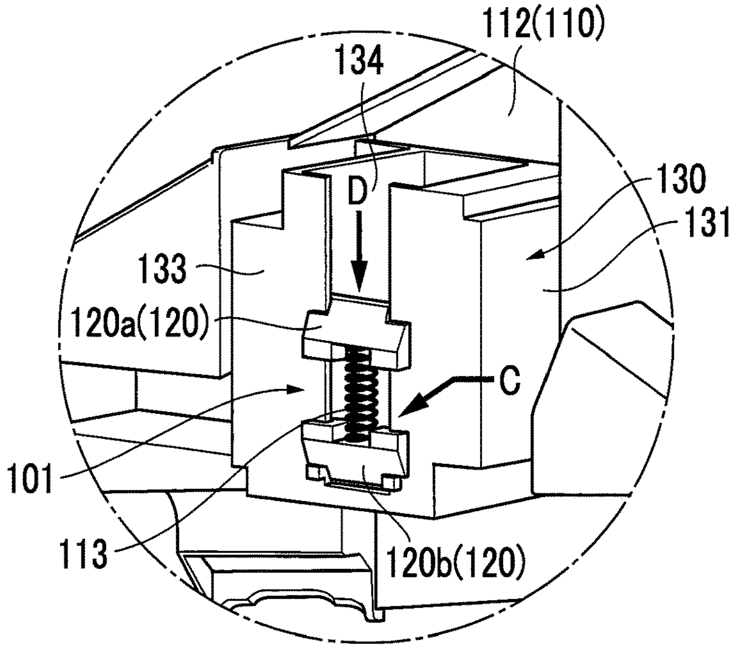
FIG. 4B is a perspective view for describing a main portion of the elastic component in a portion B shown in FIG. 4A.

In this example, as shown in FIGS. 4A and 4B, the elastic component 101 is installed on a front side of the lateral portion 112 of the front upper frame 110 which is a portion of the device body 22, and includes an elastically deformable spring member 113 that expands/contracts in the vertical direction, and a pair of holders 120 (specifically, 120*a* and 120*b*) that hold both ends of the spring member 113.

Spring Member

In this example, the spring member 113 uses a compression coil spring elastically deformed in a compressing direction to apply a biasing force in a tension direction.

Holder

In addition, as shown in FIGS. 4A to 4D, the holders 120 (120*a* and 120*b*) having the same shape are vertically symmetrically arranged.

In this example, the holder 120 has a holder base portion 121 that receives both ends of the spring member 113. The holder base portion 121 has a rectangular receiving surface 122 having a short side having a length substantially equal to an outer diameter of the spring member 113 and a long side having a length several times the outer diameter of the spring member 113. A cross-sectional shape protruding in a direction separated from the spring member 113 with respect to the receiving surface 122 and extending along a short side direction of the receiving surface 122 is formed in a substantially isosceles triangular shape with an acute angle, and a guided projection 123 extending in a long side direction of the receiving surface 122 is sharply formed in the tip. A pair of rectangular parallelepiped holder wall portions 124 are integrally formed on both sides in the long side direction of the receiving surface 122 of the holder base portion 121. A recessed location 125 accommodating an end portion of the spring member 113 is secured between the pair of holder wall portions 124. A positioning boss 126 positioning both ends of the spring member 113 is formed in a bottom portion of the recessed location 125. In addition, in this example, recessed grooves 127 having a rectangular cross section extending in the expanding/contracting direction of the spring member 113 are formed on both outer sides in the long side direction of the receiving surface 122 in the holder wall portion 124 of the holder 120 are formed, and the recessed groove 127 is also formed to be continuous to the holder base portion 121 side. Furthermore, a pair of cutout portions 128 cut out in a substantially rectangular shape are formed on both sides in the long side direction of the receiving surface 122 in the guided projection 123 of the holder base portion 121.

Attachment Structure Example of Elastic Component

In this example, as shown in FIGS. 4A to 4D, the elastic component 101 is supported by the lateral portion 112 of the front upper frame 110 to be floatable in the vertical direction via an attachment case 130.

Here, the attachment case 130 has a case body 131 integrally formed to project in a box shape on a front side (corresponding to a side facing the opening/closing door 25) of the lateral portion 112 of the front upper frame 110. The case body 131 has a case front wall 133 that projects with a predetermined gap from the front surface of the lateral portion 112 of the front upper frame 110, and a movement groove 134 having a bottomed slit shape extending vertically downward from substantially the center of an upper edge is formed on the case front wall 133.

The recessed grooves 127 formed on both sides of the holder 120 (120*a* and 120*b*) are fitted to both side edges of the movement groove 134 to be slidable (corresponding to sliding movement), and the holder 120 is supported to be floatable along the movement groove 134.

Figure 4C:
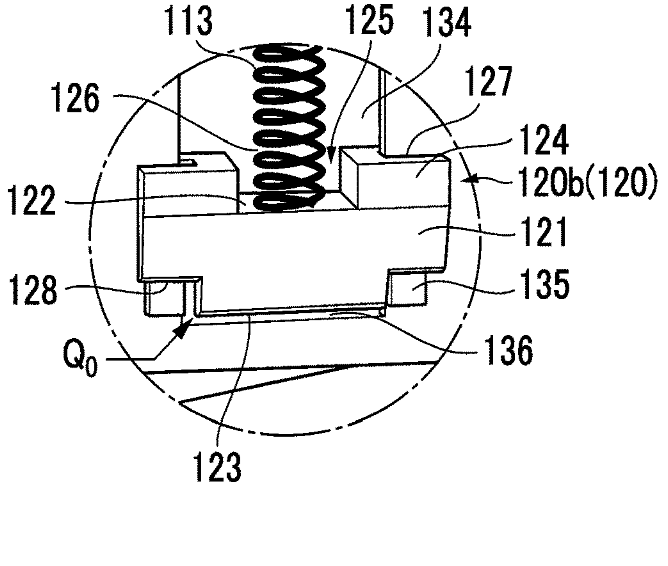
FIG. 4C is a detailed view of a portion C shown in FIG. 4B.
Figure 4D:
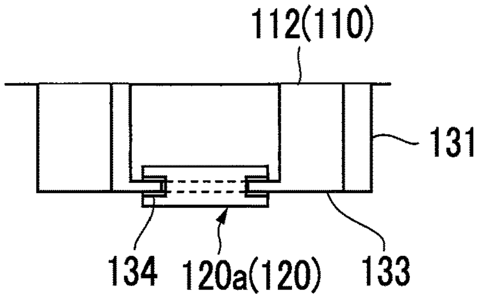
FIG. 4D is a view in a direction of an arrow D shown in FIG. 4B.

In addition, in this example, stopper stepped portions 135 are formed on both sides near a terminal edge of the movement groove 134 on the case front wall 133. In the stopper stepped portions 135, the cutout portion 128 of a lower holder 120*b* of the elastic component 101 hits the stopper stepped portion 135. When the elastic component 101 is not in contact with the latch component 102, that is, when the restrained state is released by the latch component 102, the stopper stepped portions 135 restricts an initial position Q0 of the elastic component 101. In this example, when the elastic component 101 is located at the initial position Q0, as shown in FIG. 4C, a minute gap 136 is secured between the guided projection 123 located in the tip of the lower holder 120*b* of the elastic component 101 and the terminal edge the movement groove 134.

In this example, in a case where the elastic component 101 is attached to the attachment case 130, first, the pair of holders 120 (120*a* and 120*b*) may be temporarily held in both ends of the spring member 113 to assemble the elastic component 101. Thereafter, the recessed grooves 127 of the pair of holders 120 (120*a* and 120*b*) of the elastic component 101 may be fitted into both side edges of the movement groove 134 of the attachment case 130. The elastic component 101 may be dropped by using the own weight to stop at the initial position Q0.

Configuration Example of Latch Component

Figure 5A:
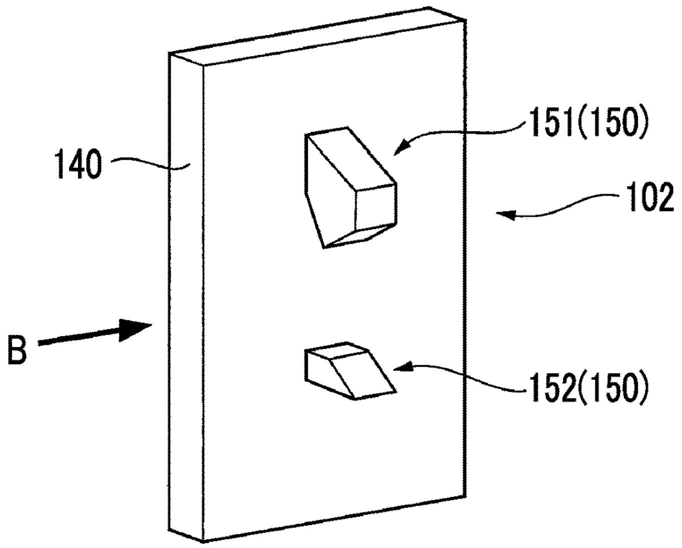
FIG. 5A is a perspective view for describing a main portion of a latch component of the latch mechanism according to Exemplary Embodiment 1.
Figure 5B:
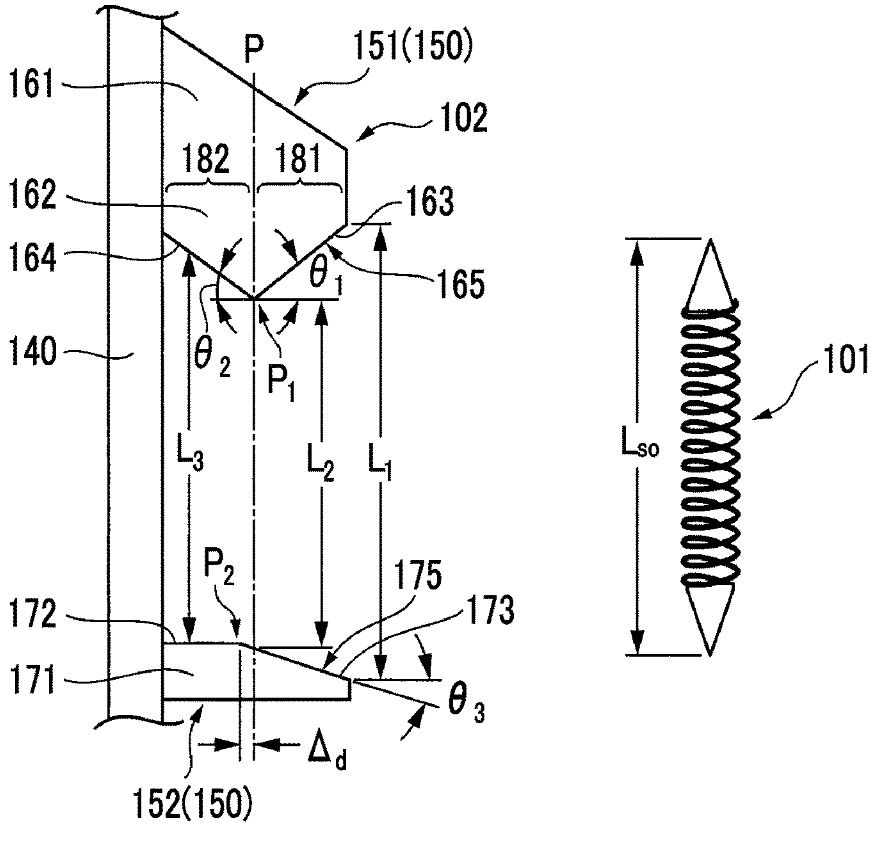
FIG. 5B is a view in a direction of an arrow B shown in FIG. 5A.

In the present exemplary embodiment, as shown in FIGS. 2, 5A, and 5B, the latch component 102 uses one integrally molded by using a resin material separate from the opening/closing door 25.

In this example, the latch component 102 includes a substantially rectangular plate-shaped base member 140 fixed to a predetermined position inside the opening/closing door 25 via a stopper (not shown), and a latch member 150 provided in the base member 140 adopting a posture along the vertical direction and protruding toward the elastic component 101 on the device body 22 side when the opening/closing door 25 is located at a closing position. When the opening/closing door 25 is closed, the latch member 150 pinches the elastic component 101 from above and below to restrain the elastic component 101.

In this example, the latch member 150 includes an upper latch arm 151 protruding toward the upper holder 120*a* of the elastic component 101 on the device body 22 side, and a lower latch arm 152 provided on the lower side of the upper latch arm 151 of the base member 140 and protruding toward the lower holder 120*b* of the elastic component 101 on the device body 22 side.

In this example, as a resin material used for manufacturing the latch component 102, for example, a function of restraining the elastic component 101 while elastically deforming the elastic component 101 is required. Therefore, any resin material may be provided as long as the resin material has at least rigidity to withstand elastic deforming required by the spring member 113. Furthermore, for example, the configuration is preferable to devise that shapes of the upper latch arm 151 and the lower latch arm 152 are less likely to be elastically deformed.

Upper Latch Arm and Lower Latch Arm

In this example, both the upper latch arm 151 and the lower latch arm 152 protrude with a width dimension narrower than a width dimension of the movement groove 134 of the attachment case 130 of the elastic component 101, but have a different cross-sectional shape.

First, the upper latch arm 151 has an arm body 161 having a trapezoidal cross-sectional shape whose upper side is shorter than the lower side when the base member 140 side is the lower side, and a latch claw portion 162 protruding in a V-shaped cross-sectional shape is formed on the lower side of the arm body 161. Therefore, an inclined portion 163 in which a side separated from the base member 140 by using the upper inflection point (corresponding to an upper apex) P1 as a boundary is inclined at an angle θ1 with respect to the horizontal direction, and an inclined portion 164 in which a side closer to the base member 140 by using the upper inflection point (corresponding to an upper apex) P1 as a boundary is inclined at an angle θ2 (in this example, θ1=θ2) are inclined on the lower surface of the latch claw portion 162, and the surface of the inclined portions 163 and 164 is formed as an upper latch guide surface 165.

In addition, the lower latch arm 152 has a tongue-shaped arm projection piece 171 protruding in a direction substantially orthogonal to the base member 140, and the base member 140 side is formed as a horizontal portion 172 on the upper side of the arm projection piece 171. An inclined portion 173 inclined at an angle θ3 (in this example, θ2>θ3) with respect to the horizontal portion 172 is formed so that a side separated from the base member 140 is a sharp tip portion. Therefore, a lower latch guide surface 175 changed in a V-shape at an angle wider than an angle of the upper latch guide surface 165 of the above-described latch claw portion 162 is formed on the upper surface of the horizontal portion 172 and the inclined portion 173 of the arm projection piece 171.

Furthermore, in this example, a span between the upper latch arm 151 and the lower latch arm 152 in the latch member 150 is changed in response to a change between the upper latch guide surface 165 and the lower latch guide surface 175.

Now, as shown in FIG. 5B, in a case where the span at an entrance position between the upper latch guide surface 165 and the lower latch guide surface 175 is defined as L1, the span at a position beyond the upper inflection point P1 of the upper latch guide surface 165 is defined as L2, the span at a latch position that restrains the elastic component 101 is defined as L3, and the length of the elastic component 101 in the expanding/contracting direction at the initial position Q0 is defined as LS0, the following expression is satisfied.

$$L1>LS0>L3>L2 \quad (I)$$

First Guide Portion and Second Guide Portion

In this example, the latch member 150 (specifically, the upper latch arm 151 and the lower latch arm 152) has a first guide portion 181 guiding a pair of holders 120 (120*a* and 120*b*) so that a compression amount of the spring member 113 is a peak value by gradually performing compressive deforming on the spring member 113 from an initial state when the opening/closing door 25 closes the opening 23 and after latch of the elastic component 101 starts, and a second guide portion 182 guiding the holders 120 (120*a* and 120*b*) to reach a latch position where the compression amount has a predetermined value smaller than a peak value by gradually relaxing the compressive deforming performed on the spring member 113 from a peak state after the compression amount of the spring member 113 exceeds the peak value.

The first guide portion 181 referred to herein indicates a region corresponding to the inclined portion 163 toward the upper inflection point P1 in the upper latch guide surface 165, and a region corresponding to the inclined portion 163 of the upper latch guide surface 165 in the lower latch guide surface 175.

In addition, the second guide portion 182 indicates a region corresponding to the inclined portion 164 exceeding the upper inflection point P1 in the upper latch guide surface 165, and a region corresponding to the inclined portion 164 of the upper latch guide surface 165 in the lower latch guide surface 175.

In addition, in this example, the upper latch arm 151 has the upper latch guide surface 165 formed in a V-shape while the boundary line P between the first guide portion 181 and the second guide portion 182 serves as the upper inflection point P1 (corresponding to the upper apex).

In contrast, the lower latch arm 152 has the lower latch guide surface 175 formed in a V-shape at an angle wider than an angle of the upper latch guide surface 165 while a position beyond the boundary line P between the first guide portion 181 and the second guide portion 182 by Δd serves the inflection point P2.

Opening/Closing Operation Example of Opening/Closing Door

Next, in the present exemplary embodiment, an opening/closing operation example of the opening/closing door 25 will be described.

During Closing Operation of Opening/Closing Door

Figure 6:
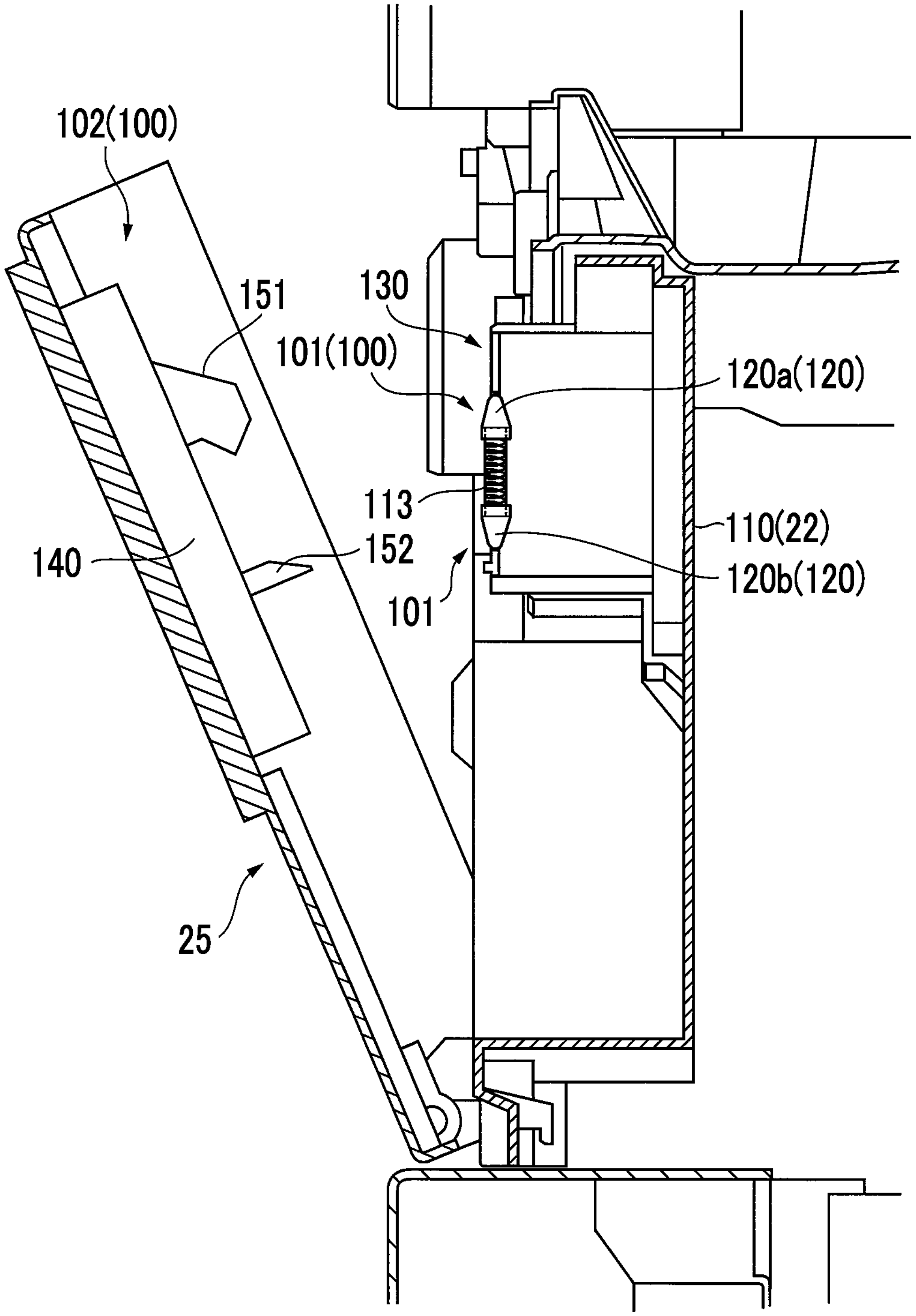
FIG. 6 is a view for describing a state before latch of the latch mechanism starts before the opening/closing door is closed in the image forming device according to Exemplary Embodiment 1.
Figure 7:
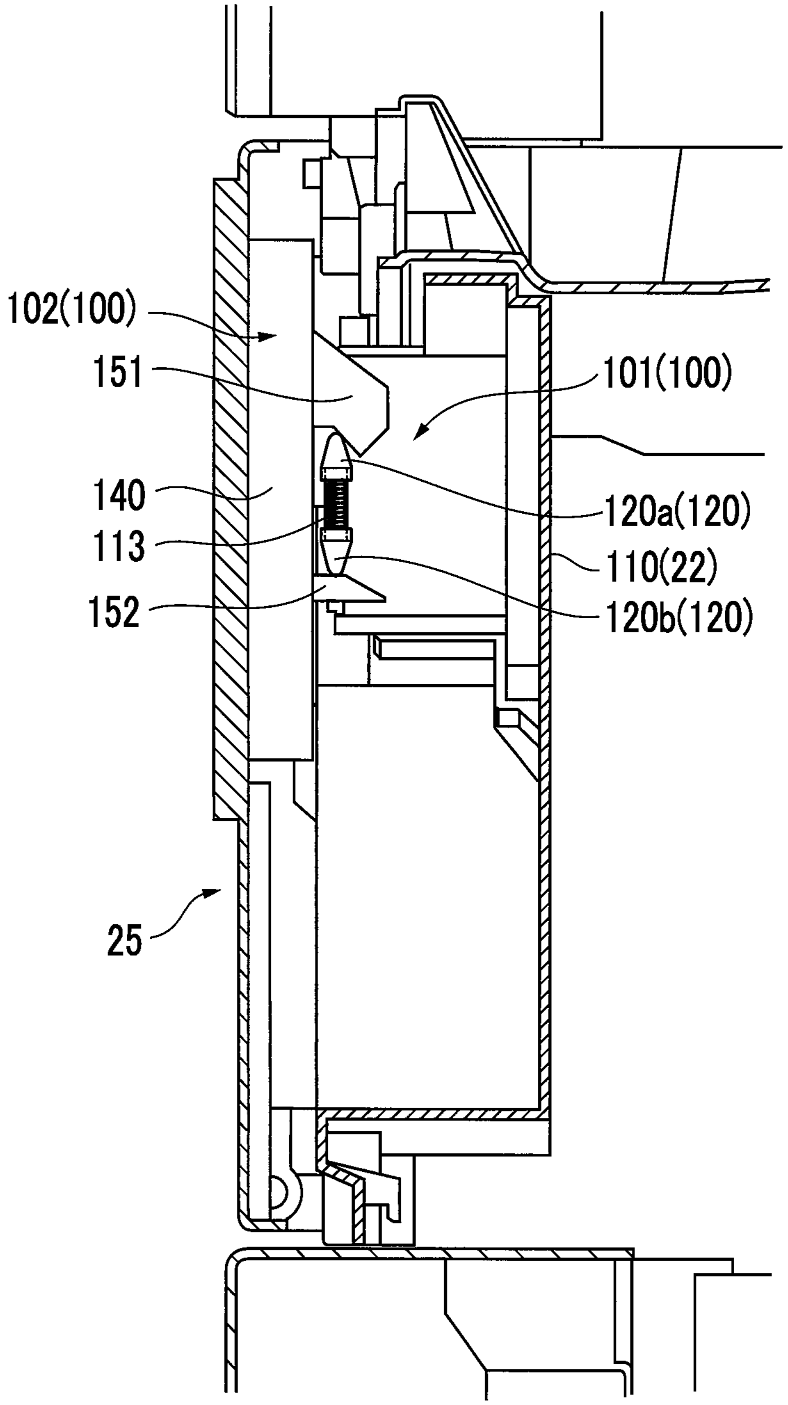
FIG. 7 is a view for describing a state where latch of the latch mechanism is completed when the opening/closing door is closed in the image forming device according to Exemplary Embodiment 1.

Now, as shown in FIG. 2, when the opening/closing door 25 at an opening position is closed, as shown in FIG. 6, in a case where the opening/closing door 25 is moved toward a closing position, the latch component 102 of the latch mechanism 100 moves toward the elastic component 101 of the device body 22 (in this example, the front upper frame 110), and the latch member 150 (upper latch arm 151 and lower latch arm 152) of the latch component 102 abuts on the upper and lower holders 120 (120*a* and 120*b*) of the elastic component 101 attached to the attachment case 130 to be floatable so that the upper and lower holders 120 (120*a* and 120*b*) are pinched from above and below, and a latch operation by the latch component 102 starts. When the opening/closing door 25 reaches the closing position, as shown in FIG. 7, the latch component 102 pinches and restrains the elastic component 101 while elastically deforming the elastic component 101, and the latch operation of the elastic component 101 by the latch component 102 is completed.

Behavior of Latch Mechanism During Closing Operation of Opening/Closing Door

In addition, a behavior of the latch mechanism 100 in response to the opening/closing operation of the opening/closing door 25 will be described in detail with reference to FIGS. 4A to 5D and 8A to 8D.

In FIGS. 8A to 8D, the elastic component 101 is represented by simplifying the shapes of the spring member 113 and the holder 120 (120*a* and 120*b*). In addition, the latch component 102 is represented by simplifying the shape of the latch member 150 (upper latch arm 151 and lower latch arm 152).

Figure 8A:
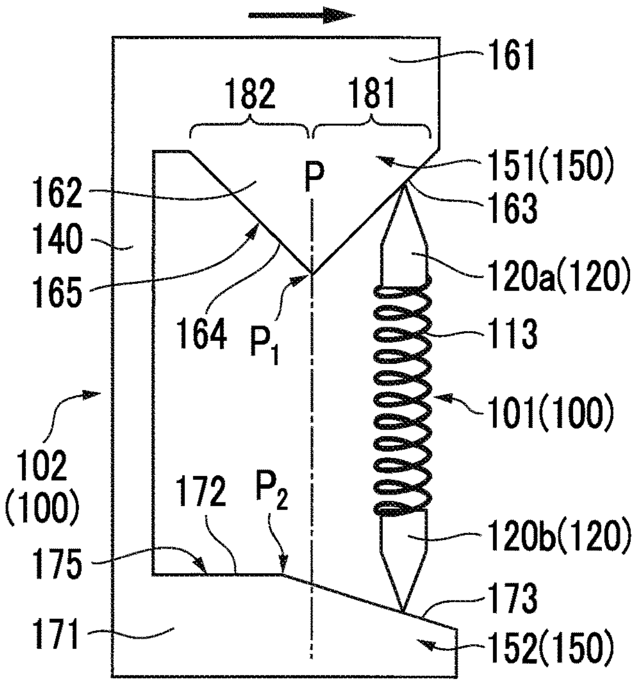
FIGS. 8A to 8D schematically show a behavior of the latch mechanism when the opening/closing door is closed in the image forming device according to Exemplary Embodiment 1.

Now, in a case where the opening/closing door 25 moves toward the closing position, and the latch operation of the elastic component 101 by the latch component 102 starts, as shown in FIG. 8A, the latch member 150 (upper latch arm 151 and lower latch arm 152) causes the elastic component 101 to float along the movement groove 134 while pinching the tip portions of the upper and lower holders 120 (120*a* and 120*b*) of the elastic component 101 located at the initial position Q0. In this case, the holder 120 (120*a* and 120*b*) of the elastic component 101 comes into contact with the first guide portion 181 of the latch member 150 while the spring member 113 of the elastic component 101 has a free length before compressive deforming.

Thereafter, in a case where the opening/closing door 25 is further moved toward the closing position, the holder 120 of the elastic component 101 is guided toward the upper inflection point P1 along the first guide portion 181, and the span between the pair of holders 120 is gradually narrowed by the first guide portion 181. Therefore, the spring member 113 held by the holder 120 is gradually compressed and deformed from the initial state.

Figure 8B:
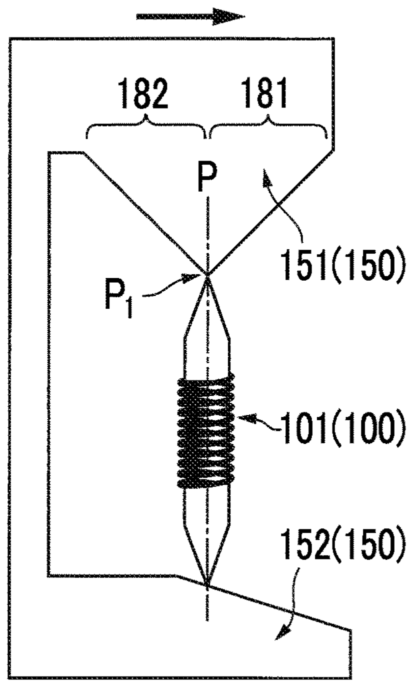

As shown in FIG. 8B, in a case where the holder 120 of the elastic component 101 reaches the upper inflection point P1, the span between the pair of holders 120 is minimized. Therefore, the compression amount of the spring member 113 reaches the peak value.

Thereafter, in a case where the opening/closing door 25 is further moved toward the closing position, the holder 120 of the elastic component 101 is guided along the second guide portion 182. In a case where the holder 120 reaches the second guide portion 182, the span between the pair of holders 120 is gradually widened from a minimum span L2. Therefore, the compression amount of the spring member 113 held by the holder 120 is gradually relaxed from the peak value.

Figure 8C:
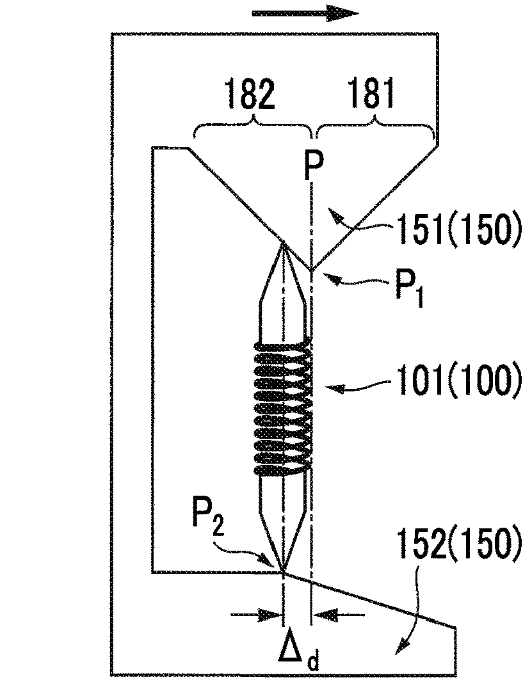

In particular, in this example, as shown in FIG. 8C, the holder 120 of the elastic component 101 passes through the lower inflection point P2. In this case, a widening change rate of the span between the holders 120 of the elastic component 101 located between the second guide portions 182 increases in the rear compared to a widening change rate in front of the lower inflection point P2. Therefore, the elastic component 101 is likely to be pulled into the second guide portion 182.

Figure 8D:
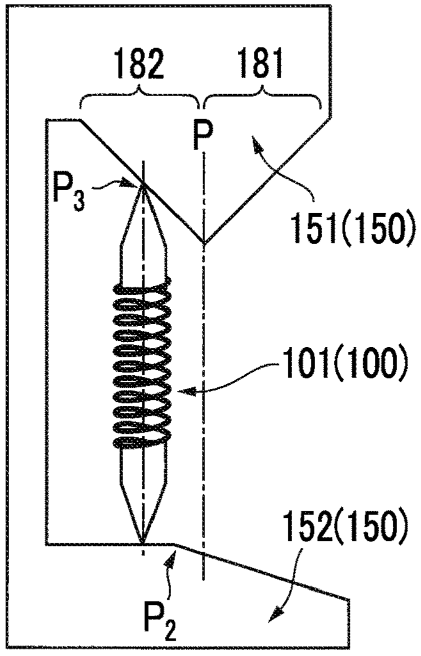

In a case where the opening/closing door 25 reaches the closing position, as shown in FIG. 8D, the elastic component 101 reaches a latch position P3 exceeding the lower inflection point P2. The spring member 113 of the elastic component 101 is held at the latch position P3 of the second guide portion 182 in a state of maintaining the compression amount having a predetermined value smaller than the peak value.

In this state, the latch member 150 (upper latch arm 151 and lower latch arm 152) pinches and restrains the elastic component 101 while the elastic component 101 is compressed and deformed. Therefore, the latch operation of the elastic component 101 by the latch component 102 is completed.

In this case, the latch position P3 of the elastic component 101 by the latch component 102 is determined depending on attachment accuracy of the latch component 102. Therefore, the attachment position of the latch component 102 may be properly selected so that a latch force or an operation force of the latch mechanism 100 is proper.

In this way, in this example, the elastic component 101 is provided on the device body 22 side, and the latch component 102 is provided on the opening/closing door 25 side. However, the elastic component 101 is provided to be floatable with respect to the device body 22. Accordingly, even in a case where the elastic component 101 has an attachment error, the attachment error is absorbed in the expanding/contracting direction of the elastic component 101. Therefore, a tolerance between the elastic component 101 and the latch component 102 does not cumulatively increase, and the latch force or the operation force of the latch mechanism 100 is determined depending on the attachment accuracy of the latch component 102.

During Opening Operation of Opening/Closing Door

On the other hand, when the opening/closing door 25 at the closing position is to be opened, as shown in FIG. 7, in a case where the opening/closing door 25 is opened at the closing position, the latch component 102 of the latch mechanism 100 moves in a direction separated from the elastic component 101 of the device body 22. As shown in FIG. 6, the restrained state of the elastic component 101 by the latch component 102 is released, a latch release operation of the elastic component 101 by the latch component 102 is completed, and the opening/closing door 25 is opened at the opening position shown in FIG. 2.

Behavior of Latch Mechanism During Opening Operation of Opening/Closing Door

In this case, in a case where the opening/closing door 25 is located at the closing position, as shown in FIG. 8D, the latch component 102 is pinched and restrained in a state where the elastic component 101 is compressed and deformed at the predetermined latch position P3.

In this state, in a case where the opening/closing door 25 is opened at the closing position, the operation force for opening the opening/closing door 25 may act against the latch force (corresponding to a biasing force of the spring member 113 at the latch position P3) of the latch mechanism 100 at the latch position P3. However, the latch force of the latch mechanism 100 at the latch position P3 is properly and easily selected. Therefore, there is no possibility that the operation force for opening the opening/closing door 25 may unnecessarily increase.

In a case where the opening/closing door 25 is opened in this way, the latch mechanism 100 can release the latch state of the elastic component 101 through states in FIG. 8D→FIG. 8C→FIG. 8B→FIG. 8A.

Exemplary Embodiment 2

Configuration Example of Latch Mechanism

FIGS. 9A to 9D are views for describing a main portion of the latch mechanism according to Exemplary Embodiment 2.

In the present exemplary embodiment, unlike Exemplary Embodiment 1, in the latch mechanism 100, the elastic component 101 is provided on the opening/closing door 25 (refer to FIG. 2) side, and a latch component 102 is provided on the device body 22 (refer to FIG. 2) side.

In this example, the elastic component 101 holds both ends of the spring member 113 by the pair of holders 120 (120*a* and 120*b*), and supports the holder 120 with respect to the opening/closing door 25 to be floatable in the expanding/contracting direction of the spring member 113 by using a method substantially the same as a method in Exemplary Embodiment 1.

In particular, in this example, unlike Exemplary Embodiment 1, in the holder 120 (120*a* and 120*b*) of the elastic component 101, an upper latch guide surface 265 changed in a V-shape while the upper inflection point P1 serves as a boundary is formed on the upper side of the upper holder 120*a*. In addition, a lower latch guide surface 275 changed in a V-shape at an angle wider than an angle of the upper latch guide surface 265 while the lower inflection point P2 serves as a boundary is formed on the lower side of the lower holder 120*b*.

In addition, in the latch component 102, the latch member 150 (upper latch arm 151 and lower latch arm 152) is integrally provided in the base member 140. However, the upper latch arm 151 has an arm projection piece 191 protruding from the arm projection piece 191 is in a direction substantially orthogonal to the base member 140, and has a latch claw portion 192 having an isosceles triangular cross-sectional shape whose lower side is a sharp tip portion is formed in the tip portion of the arm projection piece 191. On the other hand, the lower latch arm 152 is provided symmetrically with the upper latch arm 151, has an arm projection piece 201 protruding in a direction substantially orthogonal to the base member 140, and has a latch claw portion 202 having an isosceles triangular cross-sectional shape whose upper side is a sharp tip portion is formed in the tip of the arm projection piece 201.

Furthermore, in this example, the holder 120 (upper holder 120*a* and lower holder 120*b*) has a first guide portion 281 guiding a latch member 150 (upper latch arm 151 and lower latch arm 152) so that the compression amount of the spring member 113 is the peak value by gradually performing compressive deforming on the spring member 113 from the initial state when the opening/closing door 25 closes the opening 23 and after latch of the elastic component 101 starts, and a second guide portion 282 guiding the latch member 150 (upper latch arm 151 and lower latch arm 152) to reach the latch position P3 where the compression amount has a predetermined value smaller than the peak value by gradually relaxing the compressive deforming performed on the spring member 113 from the peak state after the compression amount of the spring member 113 exceeds the peak value.

The first guide portion 281 referred to herein indicates a region corresponding to an inclined portion 263 toward the upper inflection point P1 on the upper latch guide surface 265, and a region corresponding to the inclined portion 263 of the upper latch guide surface 265 on the lower latch guide surface 275.

In addition, the second guide portion 282 indicates a region corresponding to an inclined portion 264 exceeding the upper inflection point P1 on the upper latch guide surface 265, and a region corresponding to the inclined portion 264 of the upper latch guide surface 265 on the lower latch guide surface 275.

In addition, in this example, the upper holder 120*a* has the upper latch guide surface 265 formed in a V-shape while the boundary line P between the first guide portion 281 and the second guide portion 282 serves as the upper inflection point P1 (corresponding to the upper apex).

In contrast, the lower holder 120*b* has the lower latch guide surface 275 formed in a V-shape at an angle wider than an angle of the upper latch guide surface 265 while the position slightly exceeding the boundary line P between the first guide portion 281 and the second guide portion 282 serves as the lower inflection point P2.

Behavior of Latch Mechanism

Figure 9A:
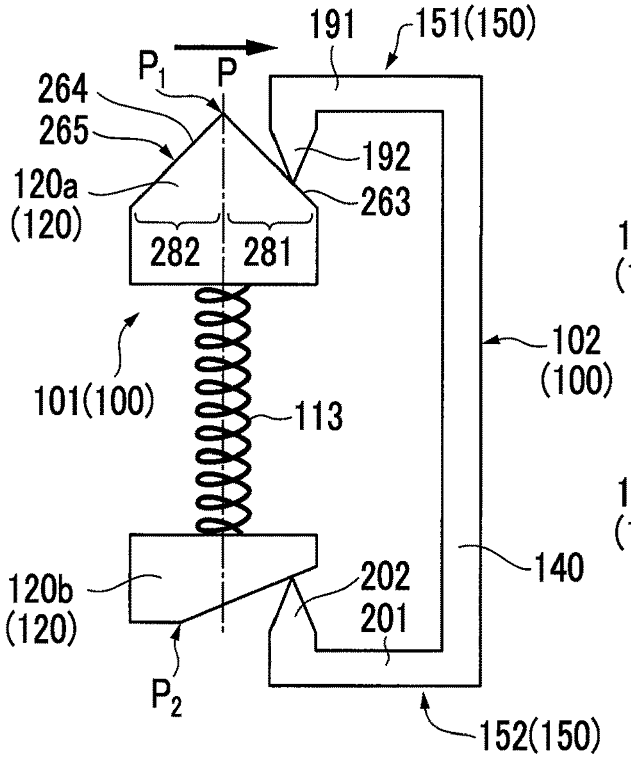
FIGS. 9A to 9D schematically show a behavior of a latch mechanism when an opening/closing door is closed in an image forming device according to Exemplary Embodiment 2.

According to the latch mechanism 100 in the present exemplary embodiment, in a case where the opening/closing door 25 is to be closed at the opening position, the elastic component 101 on the opening/closing door 25 side moves toward the latch component 102 on the device body 22 side, and as shown in FIG. 9A, the latch claw portions 192 and 202 of the latch member 150 (upper latch arm 151 and lower latch arm 152) abut on the first guide portion 281 of the holder 120 (upper holder 120*a* and lower holder 120*b*) of the elastic component 101. In a case where the opening/closing door 25 further moves in the closing direction, the latch claw portions 192 and 202 of the latch member 150 (upper latch arm 151 and lower latch arm 152) are guided toward the upper inflection point P1 along the first guide portion 281, and are pushed in an approaching direction of the holder 120 (upper holder 120*a* and lower holder 120*b*) of the elastic component 101. Therefore, the span between the pair of holders 120 is gradually narrowed by the first guide portion 281, and the spring member 113 held by the holders 120 is gradually compressed and deformed from the initial state.

Figure 9B:
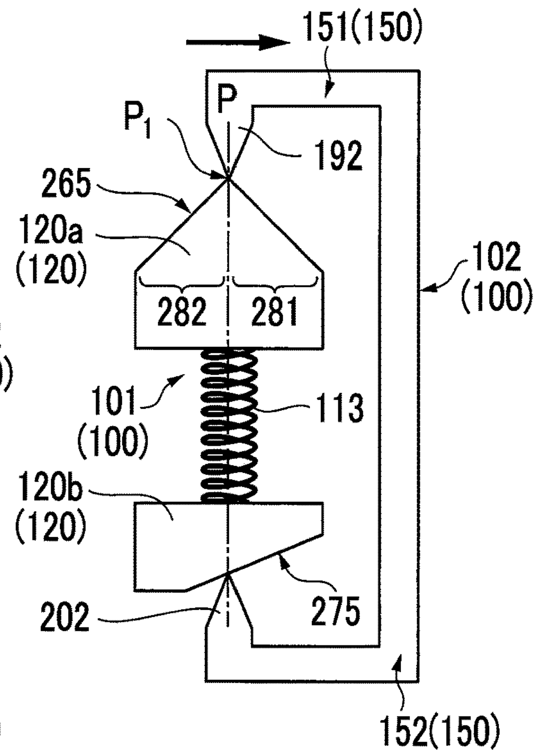

As shown in FIG. 9B, in a case where the holder 120 of the elastic component 101 reaches the upper inflection point P1, the span between the pair of holders 120 is minimized. Therefore, the compression amount of the spring member 113 reaches the peak value.

Thereafter, in a case where the opening/closing door 25 is further moved toward the closing position, the latch claw portions 192 and 202 of the latch member 150 (upper latch arm 151 and lower latch arm 152) are guided along the second guide portion 282. In a case where the latch claw portions 192 and 202 reach the second guide portion 282, the span between the pair of holders 120 is gradually widened from the minimum span L2. Therefore, the compression amount of the spring member 113 held by the holder 120 is gradually relaxed from the peak value.

Figure 9C:
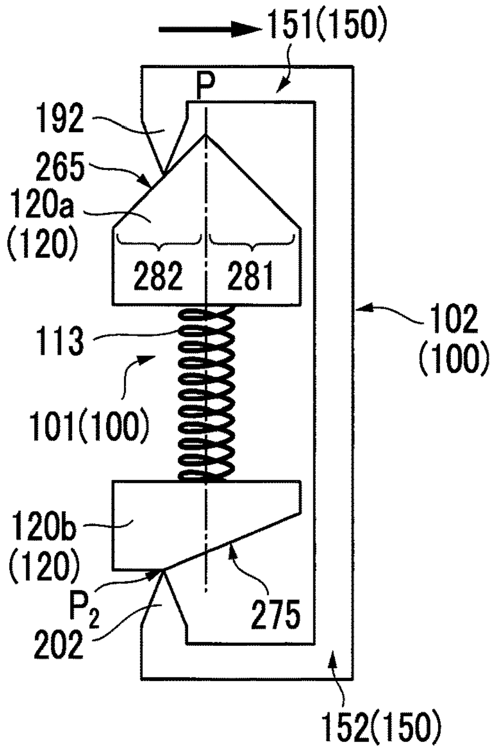

In particular, in this example, as shown in FIG. 9C, the holder 120 of the elastic component 101 also passes through the lower inflection point P2. In this case, the widening change rate of the span between the holders 120 of the elastic components 101 located between the second guide portions 282 increases in the rear compared to the widening change rate in front of the lower inflection point P2. Therefore, the elastic components 101 is likely to be pulled into the second guide portion 282.

Figure 9D:
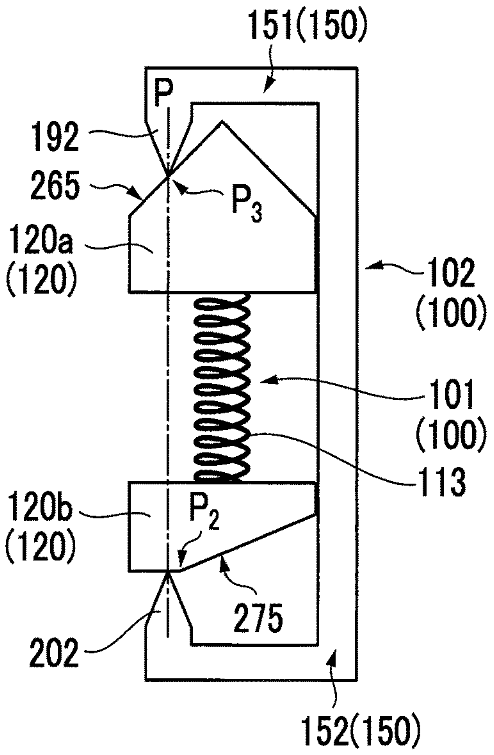

In a case where the opening/closing door 25 reaches the closing position, as shown in FIG. 9D, the latch claw portions 192 and 202 of the latch member 150 (upper latch arm 151 and lower latch arm 152) reach the latch position P3 exceeding the lower inflection point P2. The spring member 113 of the elastic component 101 is held at the latch position P3 of the second guide portion 282 in a state of maintaining the compression amount having a predetermined value smaller than the peak value.

In this state, the latch member 150 (upper latch arm 151 and lower latch arm 152) pinches and restrains the elastic component 101 while the elastic component 101 is compressed and deformed. Therefore, the latch operation of the elastic component 101 by the latch component 102 is completed.

In a case where the opening/closing door 25 is opened at the closing position, the latch mechanism 100 can release the latch state of the elastic component 101 through states in FIG. 9D→FIG. 9C→FIG. 9B→FIG. 9A Exemplary Embodiment 3

FIGS. 10A to 10D are views for describing a main portion of the latch mechanism according to the Exemplary Embodiment 3.

In the present exemplary embodiment, as in Exemplary Embodiment 1, in the latch mechanism 100, the elastic component 101 is provided on the device body 22 (refer to FIG. 2) side, and the latch component 102 is provided on the opening/closing door 25 (refer to FIG. 2) side. However, unlike Exemplary Embodiments 1 and 2, the latch component 102 spreads and restrains the elastic component 101.

In this example, a basic configuration of the elastic component 101 is substantially the same as a basic configuration in Exemplary Embodiment 1. However, unlike Exemplary Embodiment 1, the spring member 114 uses a tension coil spring which applies a biasing force in a compression direction by being elastically deformed in the tension direction. In addition, unlike Exemplary Embodiment 1, the holder 120 (120*a* and 120*b*) holding both ends of the spring member 114 is arranged so that the guided projections 123 having a projection shape (for example, an isosceles triangular cross-sectional shape) face each other, and has a structure (for example, a recessed portion) in which an end portion of the spring member 114 is hooked on a portion of the guided projection 123.

In addition, in the latch component 102, for example, the latch member 150 is integrally formed inside the opening/closing door 25. In this example, the latch member 150 has one latch block 153. The upper side facing the upper holder 120*a* of the latch block 153 has an upper latch guide surface 365 protruding upward and formed in a V-shape while the upper inflection point P1 serves as the boundary, and the lower side facing the lower holder 120*b* of the latch block 153 has a lower latch guide surface 375 formed in a V-shape at an angle wider than an angle of the upper latch guide surface 365 while the lower inflection point P2 serves as the boundary.

Furthermore, in this example, the latch block 153 has a first guide portion 381 guiding the holder 120 (upper holder 120*a* and lower holder 120*b*) so that a tension amount of the spring member 114 is the peak value by gradually performing tensile deforming on the spring member 114 from the initial state when the opening/closing door 25 is closed, and a second guide portion 382 guiding the holder 120 (upper holder 120*a* and lower holder 120*b*) to the latch position P3 where the tension amount has a predetermined value smaller than the peak value by gradually relaxing the tensile deforming performed on the spring member 114 from the peak state after the tension amount of the spring member 114 exceeds the peak value.

In this example, although the upper inflection point P1 and the lower inflection point P2 may coincide with each other, the lower inflection point P2 is provided to be slightly shifted to the second guide portion 382 from the upper inflection point P1.

Behavior of Latch Mechanism

Figure 10A:
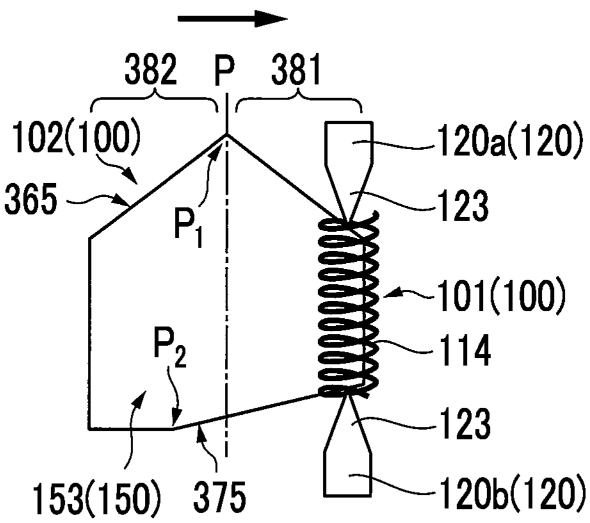
FIGS. 10A to 10D schematically show a behavior of a latch mechanism when an opening/closing door is closed in an image forming device according to Exemplary Embodiment 3.

According to the latch mechanism 100 in the present exemplary embodiment, in a case where the opening/closing door 25 is to be closed at the opening position, the latch member 150 (in this example, the latch block 153 is used) of the latch component 102 on the opening/closing door 25 side moves toward the elastic component 101 on the device body 22 side, and as shown in FIG. 10A, the holder 120 (upper holder 120*a* and lower holder 120*b*) of the elastic component 101 abuts on the first guide portion 381 of the latch member 150 (latch block 153) of the latch component 102. In a case where the opening/closing door 25 further moves in the closing direction, the holder 120 (upper holder 120*a*, lower holder 120*b*) of the elastic component 101 is guided toward the upper inflection point P1 along the first guide portion 381, and is spread in a separating direction of the holder 120 (upper holder 120*a* and lower holder 120*b*) of the elastic component 101. Therefore, the span between the pair of holders 120 is gradually widened by the first guide portion 381, and the spring member 114 held by the holders 120 is gradually subjected to tensile deforming from the initial state.

Figure 10B:
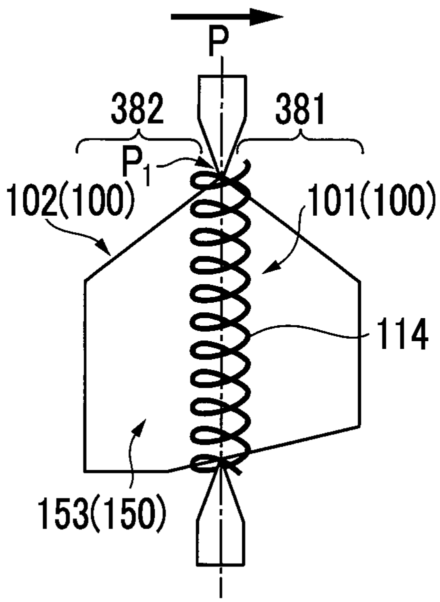

As shown in FIG. 10B, in a case where the holder 120 of the elastic component 101 reaches the upper inflection point P1, the span between the pair of holders 120 is maximized. Therefore, the tension amount of the spring member 114 reaches the peak value.

Thereafter, in a case where the opening/closing door 25 is further moved toward the closing position, the holder 120 of the elastic component 101 is guided along the second guide portion 382. In a case where the holder 120 reaches the second guide portion 382, the span between the pair of holders 120 is gradually narrowed from the maximum span. Therefore, the tension amount of the spring member 114 held by the holder 120 is gradually relaxed from the peak value.

Figure 10C:
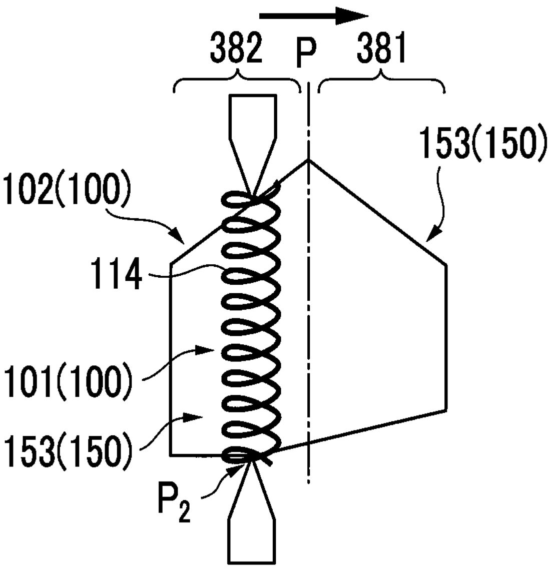

In particular, in this example, as shown in FIG. 10C, the holder 120 of the elastic component 101 also passes through the lower inflection point P2. In this case, the narrowing change rate of the span between the holders 120 of the elastic component 101 located between the second guide portions 382 increases in the rear compared to the narrowing change rate in front of the lower inflection point P2. Therefore, the elastic components 101 is likely to be pulled into the second guide portion 382.

Figure 10D:
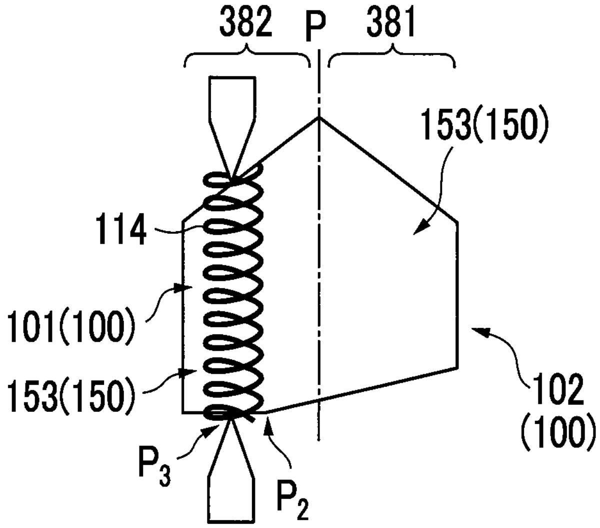

In a case where the opening/closing door 25 reaches the closing position, as shown in FIG. 10D, the holder 120 of the elastic component 101 reaches the latch position P3 exceeding the lower inflection point P2. The spring member 114 of the elastic component 101 is held at the latch position P3 of the second guide portion 382 in a state of maintaining the tension amount having a predetermined value smaller than the peak value.

In this state, the latch member 150 (latch block 153) spreads and restrains the elastic component 101 while performing tensile deforming on the elastic component 101. Therefore, the latch operation of the elastic component 101 by the latch component 102 is completed.

When the opening/closing door 25 is opened at the closing position, the latch mechanism 100 can release the latch state of the elastic component 101 through states in FIG. 10D→FIG. 10C→ FIG. 10B→FIG. 10A.

Exemplary Embodiment 4

FIGS. 11A to 11D are views for describing a main portion of the latch mechanism according to Exemplary Embodiment 4.

In the present exemplary embodiment, as in Exemplary Embodiment 2, in the latch mechanism 100, the elastic component 101 is provided on the opening/closing door 25 (refer to FIG. 2) side, and the latch component 102 is provided on the device body 22 (refer to FIG. 2) side. However, unlike Exemplary Embodiments 1 and 2, the latch component 102 spreads and restrains the elastic component 101.

In this example, a basic configuration of the elastic component 101 is substantially the same as a basic configuration in Exemplary Embodiment 1. However, unlike Exemplary Embodiment 1, the spring member 114 uses a tension coil spring which applies a biasing force in a compression direction by being elastically deformed in the tension direction. In addition, the holder 120 that holds both ends of the spring member 114 is substantially the same as the holder 120 in Exemplary Embodiment 2. However, unlike Exemplary Embodiment 2, an upper latch guide surface 465 changed to protrude in a V-shape while the upper inflection point P1 serves as the boundary is formed on the lower side of the upper holder 120*a*. In addition, a lower latch guide surface 475 changed in a V-shape at an angle wider than an angle of the upper latch guide surface 465 while the lower inflection point P2 serve as the boundary is formed on the upper side of the lower holder 120*b*.

In addition, unlike Exemplary Embodiment 2, the latch component 102 uses a rod-shaped latch block 154 extending in an upward-downward direction as the latch member 150, and latch claw portions 155 and 156 having a substantially isosceles triangular cross-sectional shape having a sharp tip portion are formed in the upper end and the lower end of the latch block 154.

Furthermore, in this example, the holder 120 (upper holder 120*a* and lower holder 120*b*) has a first guide portion 481 guiding the latch member 150 (latch block 154) so that the tension amount of the spring member 114 is the peak value by gradually performing tensile deforming on the spring member 114 from the initial state after latch of the elastic component 101 starts, when the opening/closing door 25 closes the opening 23, and a second guide portion 482 guiding the latch member 150 (latch block 154) to reach the latch position P3 where the tension amount has a predetermined value smaller than the peak value by gradually relaxing the tensile deforming performed on the spring member 114 from the peak state after the tension amount of the spring member 114 exceeds the peak value.

In this example, although the upper inflection point P1 and the lower inflection point P2 may coincide with each other, the lower inflection point P2 is provided to be slightly shifted to the second guide portion 482 from the upper inflection point P1.

Behavior of Latch Mechanism

Figure 11A:
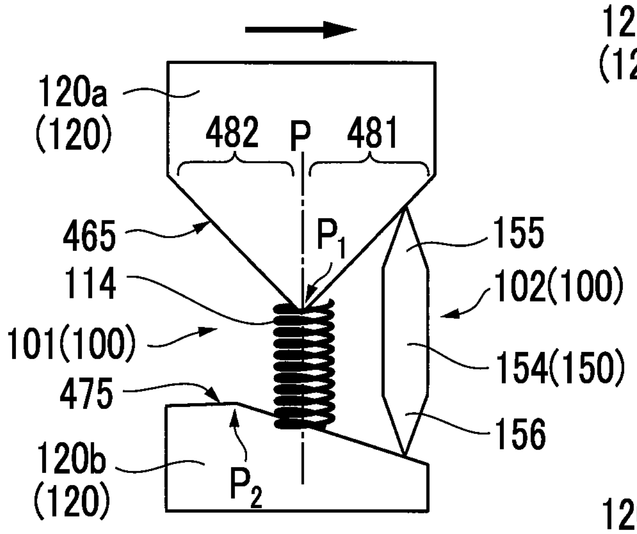
FIGS. 11A to 11D schematically show a behavior of a latch mechanism when an opening/closing door is closed in an image forming device according to Exemplary Embodiment 4.

According to the latch mechanism 100 in the present exemplary embodiment, in a case where the opening/closing door 25 is to be closed at the opening position, the elastic component 101 on the opening/closing door 25 side moves toward the latch component 102 on the device body 22 side, and as shown in FIG. 11A, the latch claw portions 155 and 156 of the latch member 150 (latch block 154) abuts on the first guide portion 481 of the holder 120 (upper holder 120*a* and lower holder 120*b*) of the elastic component 101. In a case where the opening/closing door 25 further moves in the closing direction, the latch claw portions 155 and 156 of the latch member 150 (latch block 154) are guided toward the upper inflection point P1 along the first guide portion 481, and are spread in a separating direction of the holder 120 (upper holder 120*a* and lower holder 120*b*) of the elastic component 101. Therefore, the span between the pair of holders 120 is gradually widened by the first guide portion 481, and the spring member 114 held by the holders 120 is gradually subjected to tensile deforming from the initial state.

Figure 11B:
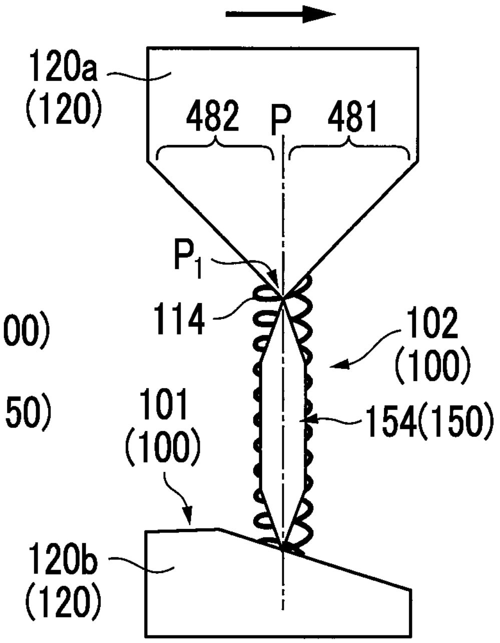

As shown in FIG. 11B, in a case where the holder 120 of the elastic component 101 reaches the upper inflection point P1, the span between the pair of holders 120 is maximized. Therefore, the tension amount of the spring member 114 reaches the peak value.

Thereafter, in a case where the opening/closing door 25 is further moved toward the closing position, the latch claw portions 155 and 156 of the latch member 150 (latch block 154) are guided along the second guide portion 482. In a case where the latch claw portions 155 and 156 reach the second guide portion 482, the span between the pair of holders 120 is gradually narrowed from the maximum span. Therefore, the tension amount of the spring member 114 held by the holder 120 is gradually relaxed from the peak value.

Figure 11C:
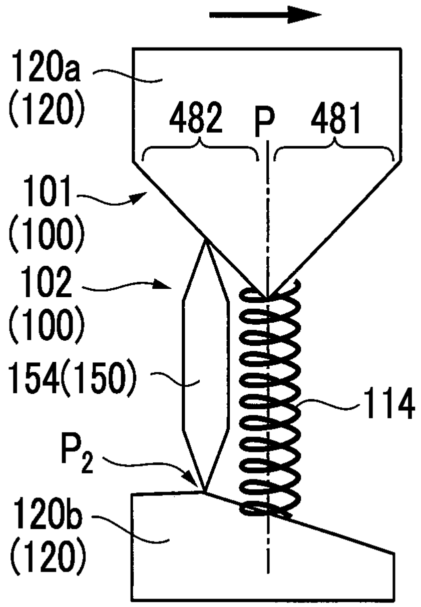

In particular, in this example, as shown in FIG. 11C, the latch claw portions 155 and 156 of the latch member 150 (latch block 154) also pass through the lower inflection point P2. In this case, the widening change rate of the span between the holders 120 of the elastic component 101 located between the second guide portions 482 increases in the rear compared to the widening change rate in front of the lower inflection point P2. Therefore, the latch member 150 (latch block 154) is likely to be pulled into the second guide portion 482.

Figure 11D:
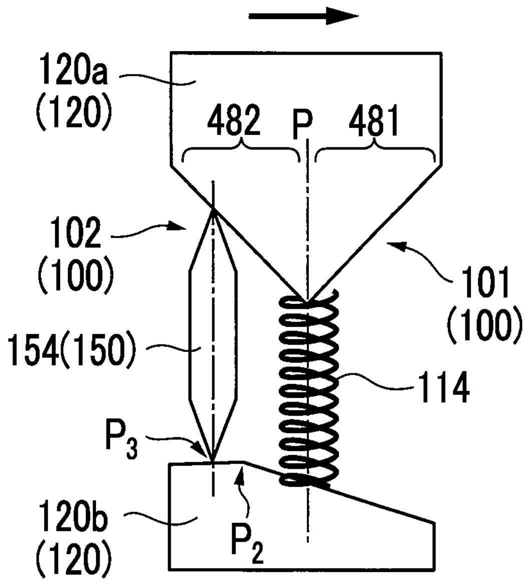

In a case where the opening/closing door 25 reaches the closing position, as shown in FIG. 11D, the latch claw portions 155 and 156 of the latch member 150 (latch block 154) reach the latch position P3 exceeding the lower inflection point P2. The spring member 114 of the elastic component 101 is held at the latch position P3 of the second guide portion 482 in a state of maintaining the tension amount having a predetermined value smaller than the peak value.

In this state, the latch member 150 (latch block 154) spreads and restrains the elastic component 101 while performing tensile deforming on the elastic component 101. Therefore, the latch operation of the elastic component 101 by the latch component 102 is completed.

In a case where the opening/closing door 25 is opened at the closing position, the latch mechanism 100 can release the latch state of the elastic component 101 through states in FIG. 11D→FIG. 11C→FIG. 11B→FIG. 11A.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A latch mechanism configured to be used in a device including an opening/closing door that opens/closes an opening of a device body of the device, wherein the latch mechanism restrains the opening/closing door at a closing position, and releases a restrained state when the opening/closing door is opened, the latch mechanism comprising:

an elastic component provided in one of the opening/closing door and the device body facing the opening, having a spring member expanding/contracting to be elastically deformable in one predetermined direction, and holding two ends of the spring member to be floatable via a holder; and a latch component provided in the other of the opening/closing door and the device body, coming into contact with the holder of the elastic component when the opening/closing door closes the opening, having a latch member restraining the elastic component in a state where the spring member is elastically deformed from an initial state, and moving the holder against a biasing force of the spring member to release the restrained state between the elastic component and the latch member when the opening/closing door is opened from the closing position.

2. The latch mechanism according to claim 1, wherein the elastic component uses the spring member that expands/contracts in a vertical direction.

3. The latch mechanism according to claim 1, wherein the elastic component forms a guide groove along an expanding/contracting direction of the spring member with respect to an installation target, and holds the holder to be slidable in the guide groove.

4. The latch mechanism according to claim 2, wherein the elastic component forms a guide groove along an expanding/contracting direction of the spring member with respect to an installation target, and holds the holder to be slidable in the guide groove.

5. The latch mechanism according to claim 1, wherein the latch component has the latch member pinching and restraining the elastic component.

6. The latch mechanism according to claim 5, wherein the latch member or the holder has a first guide portion guiding the holder or the latch member so that a compression amount of the spring member is a peak value by gradually performing compressive deforming on the spring member from the initial state when the opening/closing door closes the opening, and a second guide portion guiding the holder or the latch member to reach a latch position where the compression amount has a predetermined value smaller than the peak value by gradually relaxing the compressive deforming performed on the spring member from a peak state after the compression amount of the spring member exceeds the peak value.

7. The latch mechanism according to claim 6, wherein the latch member has a pair of latch arms for pinching the elastic component, one latch arm or holder has one side guide surface formed in a V-shape while a boundary line between the first guide portion and the second guide portion serves as an inflection point, and the other latch arm or holder has the other side guide surface formed in a V-shape at a wider angle than the one side guide surface while a position beyond the boundary line between the first guide portion and the second guide portion serves as the inflection point.

8. The latch mechanism according to claim 1, wherein the latch component has the latch member for spreading and restraining the elastic component.

9. The latch mechanism according to claim 8, wherein the latch member or the holder has a first guide portion guiding the holder or the latch member so that a tension amount of the spring member is a peak value by gradually performing tensile deforming on the spring member from the initial state when the opening/closing door closes the opening, and a second guide portion guiding the holder or the latch member so that the tension amount has a predetermined value smaller than the peak value by gradually relaxing the tensile deforming performed on the spring member from a peak state after a deforming amount of the spring member exceeds the peak value.

10. The latch mechanism according to claim 9, wherein the latch member has a latch block for spreading the elastic component, a side of the latch block facing one holder or one holder has one side guide surface formed in a V-shape while a boundary line between the first guide portion and the second guide portion serves as an inflection point, and a side of the latch block facing the other holder or the other holder has the other side guide surface formed in a V-shape at a wider angle than the one side guide surface while a position beyond the boundary line between the first guide portion and the second guide portion serves as the inflection point.

11. A device, comprising:

a device body having an opening;

an opening/closing door that opens/closes the opening; and the latch mechanism according to claim 1.

* * * * *